US012337799B2

(12) United States Patent
Moon et al.

(10) Patent No.: US 12,337,799 B2
(45) Date of Patent: Jun. 24, 2025

(54) GLOVE BOX WITH DAMPER

(71) Applicants: HYUNDAI MOBIS CO., LTD., Seoul (KR); NIFCO KOREA INC., Asan-si (KR)

(72) Inventors: Yong Gon Moon, Yongin-si (KR); Hak Young Kim, Yongin-si (KR); Jung Hun Kim, Anyang-si (KR)

(73) Assignees: Hyundai Mobis Co., Ltd., Seoul (KR); NIFCO KOREA INC., Asan-si (KR)

( * ) Notice: Subject to any disclaimer, the term of this patent is extended or adjusted under 35 U.S.C. 154(b) by 583 days.

(21) Appl. No.: 17/862,296

(22) Filed: Jul. 11, 2022

(65) Prior Publication Data

US 2023/0311778 A1 Oct. 5, 2023

(30) Foreign Application Priority Data

Apr. 4, 2022 (KR) .................. 10-2022-0041488

(51) Int. Cl.
*B60R 7/06* (2006.01)
*F16F 15/023* (2006.01)

(52) U.S. Cl.
CPC .............. *B60R 7/06* (2013.01); *F16F 15/023* (2013.01)

(58) Field of Classification Search
CPC ......... B60R 7/06; F16F 15/023; F16F 9/5126; F16F 9/342; F16F 9/0227; F16F 9/0218; F16F 9/34; F16F 9/512; E05Y 2201/256; E05Y 2201/264; E05Y 2900/538; E05F 5/10; E05F 5/00; B60Y 2410/105
USPC .................................. 296/37.12; 188/322.18
See application file for complete search history.

(56) References Cited

U.S. PATENT DOCUMENTS

| | | | | |
|---|---|---|---|---|
| 5,697,477 A | * | 12/1997 | Hiramoto | F16F 9/3465 188/322.18 |
| 6,220,583 B1 | * | 4/2001 | Ito | F16F 9/3207 267/71 |
| 6,367,785 B1 | * | 4/2002 | Nakabayashi | F16F 9/54 267/71 |
| 6,578,832 B2 | * | 6/2003 | Katoh | F16F 9/0218 267/113 |

(Continued)

FOREIGN PATENT DOCUMENTS

| | | |
|---|---|---|
| JP | 5-58996 U | 8/1993 |
| JP | 2011-69424 A | 4/2011 |
| KR | 10-2014-0054995 A | 5/2014 |

OTHER PUBLICATIONS

Korean Office Action issued on Nov. 16, 2023, in counterpart Korean Patent Application No. 10-2022-0041488 (6 pages in Korean).

*Primary Examiner* — Jason S Morrow
(74) *Attorney, Agent, or Firm* — NSIP Law

(57) ABSTRACT

A damper for a glove box includes a cylinder, a piston movably disposed in the cylinder, and a valve movably disposed in an accommodation portion of the piston. The piston includes a piston body in which an orifice is formed and a rod formed to protrude from the piston body and in which the accommodation portion is disposed. The valve includes a valve body, a pin formed to protrude from the valve body to have an end portion thereof disposed in the orifice, and a leg formed to protrude from the valve body. The valve is configured to move due to movement of the piston in a direction opposite to a movement direction of the piston to have the leg come into contact with the piston body.

31 Claims, 31 Drawing Sheets

(56) References Cited

U.S. PATENT DOCUMENTS

| | | | | |
|---|---|---|---|---|
| 6,669,178 B2* | 12/2003 | Ookawara | ............... | F16F 9/02 |
| | | | | 267/71 |
| 6,968,930 B2* | 11/2005 | Shibao | ............... | F16F 9/3235 |
| | | | | 267/64.11 |
| 7,353,922 B2* | 4/2008 | Furuya | ............... | F16F 9/0218 |
| | | | | 188/322.15 |
| 7,367,086 B2* | 5/2008 | Ito | ............... | E05F 3/02 |
| | | | | 267/221 |
| 8,028,813 B2* | 10/2011 | Kim | ............... | F16F 9/5126 |
| | | | | 188/289 |
| 8,827,056 B2* | 9/2014 | Koizumi | ............... | F16F 9/3415 |
| | | | | 188/289 |
| 9,285,010 B2* | 3/2016 | Harada | ............... | F16F 9/342 |
| 10,865,597 B2* | 12/2020 | Chen | ............... | F16F 13/007 |
| 11,841,064 B2* | 12/2023 | Cho | ............... | F16F 9/3221 |
| 12,221,823 B2* | 2/2025 | Moon | ............... | E05F 5/02 |
| 2010/0253101 A1* | 10/2010 | Seto | ............... | E05B 85/12 |
| | | | | 292/336.3 |
| 2022/0128113 A1* | 4/2022 | Saito | ............... | F16F 9/3242 |
| 2023/0279709 A1* | 9/2023 | Moon | ............... | E05F 5/02 |
| 2024/0035538 A1* | 2/2024 | Uchida | ............... | F16F 9/3242 |

* cited by examiner

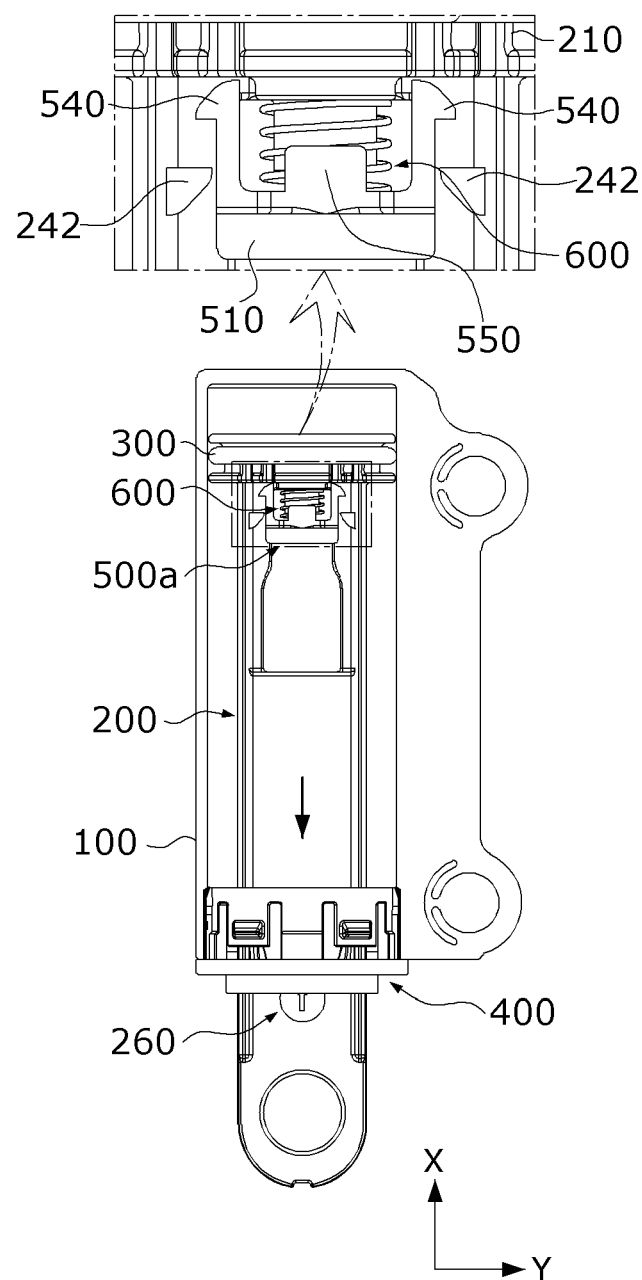

GLOVE BOX WITH DAMPER

CROSS-REFERENCE TO RELATED APPLICATION

This application claims the benefit under 35 USC 119(a) of Korean Patent Application No. 10-2022-0041488, filed on Apr. 4, 2022 in the Korean Intellectual Property Office, the entire disclosure of which is incorporated herein by reference for all purposes.

BACKGROUND

Field

The following description relates to a glove box with damper. Specifically, the present description relates to a damper for a glove box which controls opening and closing speeds of a glove box and a glove box including the same.

Discussion of Related Art

Generally, a glove box for accommodating simple objects is disposed in a dashboard or instrument panel of a vehicle. In this case, the glove box is generally disposed in front of a passenger's seat.

A cover opens or closes an inner space of the glove box to accommodate objects therein. A damper is installed to prevent rapid movement of the cover when the inner space is opened or closed.

The damper includes a cylinder and a piston, and as desired, a valve can also be installed in the cylinder in order to control a speed of the piston.

However, when a load applied to the cover of the glove box increases due to a weight of objects loaded therein or a weight of the cover, the conventional damper has a problem that an opening speed of the glove box cannot be controlled.

Accordingly, a glove box providing a feeling of a constant speed of opening a cover even with a change in load may be desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a damper for a glove box includes a cylinder, a piston movably disposed in the cylinder, and a valve movably disposed in an accommodation portion of the piston. The piston includes a piston body in which an orifice is formed and a rod formed to protrude from the piston body and in which the accommodation portion is disposed. The valve includes a valve body, a pin formed to protrude from the valve body to have an end portion thereof disposed in the orifice, and a leg formed to protrude from the valve body. The valve is configured to move due to movement of the piston in a direction opposite to a movement direction of the piston to have the leg come into contact with the piston body.

The piston may further include a stopper disposed on the rod, the valve may further include a hook disposed to correspond to the stopper, and the hook may be formed to protrude from the valve body.

A glove box may include a glove box body and a cover forming an accommodation space therebetween, and the damper disclosed herein. The glove box body may be rotationally disposed in a dashboard of a vehicle, and the damper may adjust a movement speed of the glove box body.

The stoppers may include a first stopper disposed on a first surface of the rod and a second stopper disposed on a second surface of the rod, a first separation distance from the piston body to the first stopper may be greater than a second separation distance from the piston body to the second stopper, and a hook portion of the hook may be disposed between the piston body and the first stopper or between the piston body and the second stopper.

The piston may further include a protruding portion formed to protrude from the piston body to allow the orifice to extend.

The damper may further include a sealing member disposed on an outer side surface of the piston body.

The rod may include a first surface and a second surface opposite to the first surface, and a recognition part may be disposed on the first surface or the second surface.

In another general aspect, a damper for a glove box, includes a cylinder, a piston movably disposed in the cylinder, and a valve movably disposed in an accommodation portion of the piston. The piston includes a piston body in which an orifice is formed, a rod formed to protrude from the piston body and in which the accommodation portion is disposed, and a plurality of stoppers disposed on the rod. The valve includes a valve body, a pin formed to protrude from the valve body to have an end portion thereof disposed in the orifice, and a leg and a hook formed to protrude from the valve body. The hook is disposed to correspond to each of the stoppers.

The stoppers may include a first stopper disposed on a first surface of the rod and a second stopper disposed on a second surface of the rod. A first separation distance from the piston body to the first stopper may be greater than a second separation distance from the piston body to the second stopper. A hook portion of the hook may be disposed between the piston body and the first stopper or between the piston body and the second stopper.

The damper may further include a sealing member disposed on an outer side surface of the piston body.

The rod may include a first surface and a second surface opposite to the first surface, and a recognition part may be disposed on the first surface or the second surface.

A glove box may include a glove box body and a cover forming an accommodation space therebetween, and the damper disclosed herein. The glove box body may be rotationally disposed in a dashboard of a vehicle, and the damper may adjust a movement speed of the glove box body.

An outer side surface of the pin may include an inclined surface having a predetermined inclination.

A contour of the pin may have a cross-sectional area that decreases towards an end portion thereof.

A first length of the pin may be greater than a second length of the leg based on the valve body.

The leg may include a first region formed to protrude from the valve body in a first direction, a second region extending from an end portion of the first region in a second direction, and a third region extending from an end portion of the second region in the first direction.

A distance from the valve body to the end portion of the first region in the first direction may be smaller than another distance from the valve body to an end portion of the third region in the first direction.

The end portion of the first region and an end portion of the third region may be configured to come into contact with the piston body due to movement of the valve.

The leg may be provided as at least two legs disposed to be rotationally symmetrical with respect to a center of the valve body.

The piston may further include a protruding portion formed to protrude from the piston body to allow the orifice to extend.

In another general aspect, a damper for a glove box includes a cylinder, a piston movably disposed in the cylinder, a valve movably disposed in an accommodation portion of the piston, and an elastic member elastically supporting the valve. The piston includes a piston body in which an orifice is formed, a rod formed to protrude from the piston body and in which the accommodation portion is formed, and a plurality of stoppers disposed on the rod. The valve includes a valve body, a pin formed to protrude from the valve body to have an end portion thereof disposed in the orifice, and a hook formed to protrude from the valve body. The elastic member is disposed between the piston body and the valve body, and the hook is disposed to correspond to each of the stoppers.

The stoppers may include a first stopper disposed on a first surface of the rod and a second stopper disposed on a second surface of the rod. A first separation distance from the piston body to the first stopper may be greater than a second separation distance from the piston body to the second stopper. A protruding portion of the hook may be disposed between the piston body and the first stopper or between the piston body and the second stopper.

An outer side surface of the pin may include an inclined surface having a predetermined inclination.

A contour of the pin may have a cross-sectional area that decreases towards an end portion thereof.

The piston may include a protruding portion formed to protrude from the piston body to allow the orifice to extend.

The elastic member may be provided as a coil spring having one side in contact with the piston body and another side in contact with the valve body, and the spring may be disposed outside the protruding portion.

The valve may include an escape prevention protrusion formed to protrude from the valve body, and the spring may be disposed inside the escape prevention protrusion.

The damper may further include a sealing member disposed on an outer side surface of the piston body.

The cylinder may include an inclined surface disposed thereinside, and the inclined surface has a predetermined inclination in the first direction.

The rod may include a first surface and a second surface opposite to the first surface, and a recognition part may be disposed on the first surface or the second surface.

A glove box may include a glove box body and a cover forming an accommodation space therebetween, and the damper disclosed herein. The glove box body may be rotationally disposed in a dashboard of a vehicle, and the damper may adjust a movement speed of the glove box body.

Other features and aspects will be apparent from the following detailed description, the drawings, and the claims.

BRIEF DESCRIPTION OF THE DRAWINGS

FIGS. 42 and 43 are views illustrating operation of the damper for a glove box according to the second embodiment when the glove box is heavy.

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
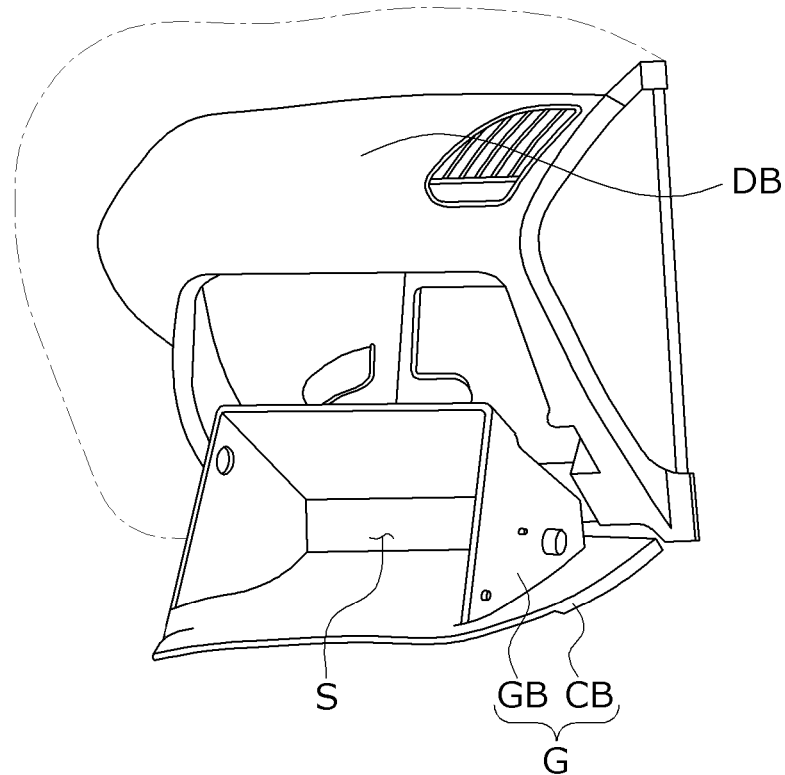
FIG. 1 is a view illustrating a glove box installed in a vehicle.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Figure 2:
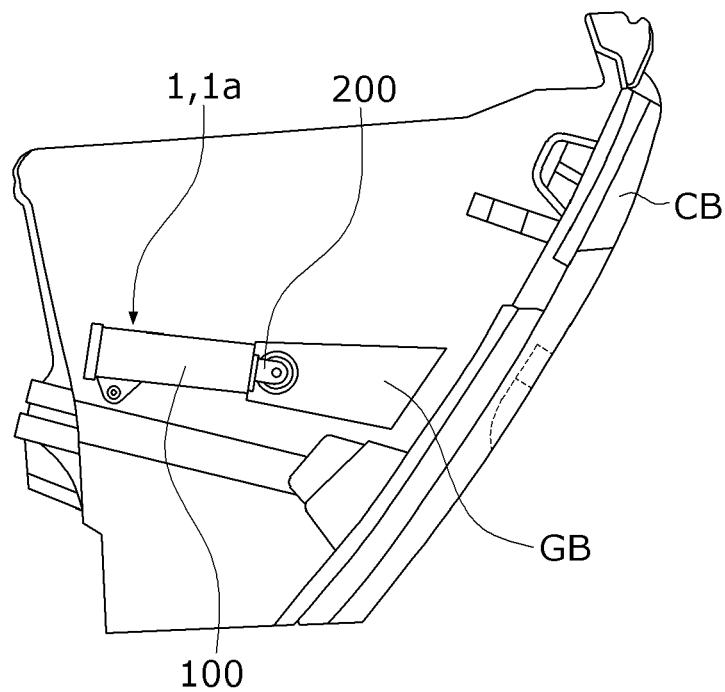
FIG. 2 is a view illustrating a state in which a glove box is closed by a damper for a glove box according to an embodiment.
Figure 3:
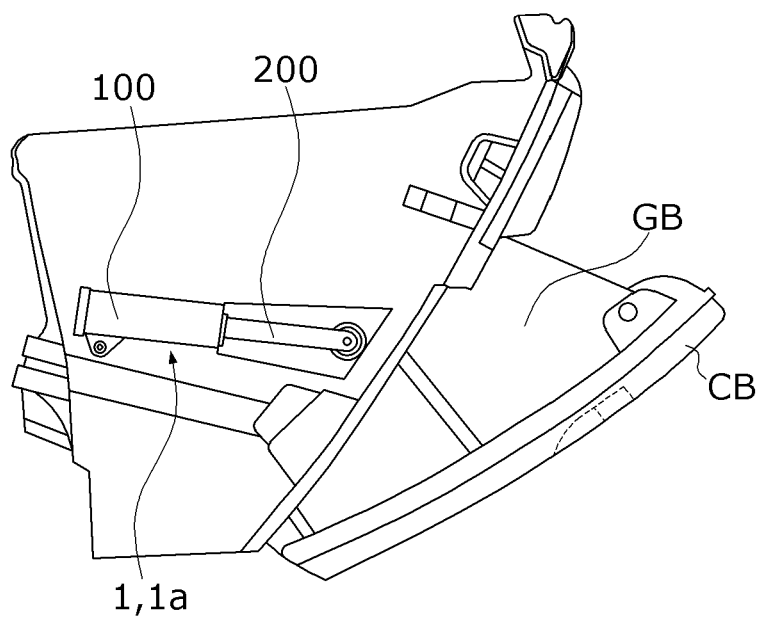
FIG. 3 is a view illustrating a state in which the glove box is opened by the damper for a glove box according to the embodiment.
Figure 4:
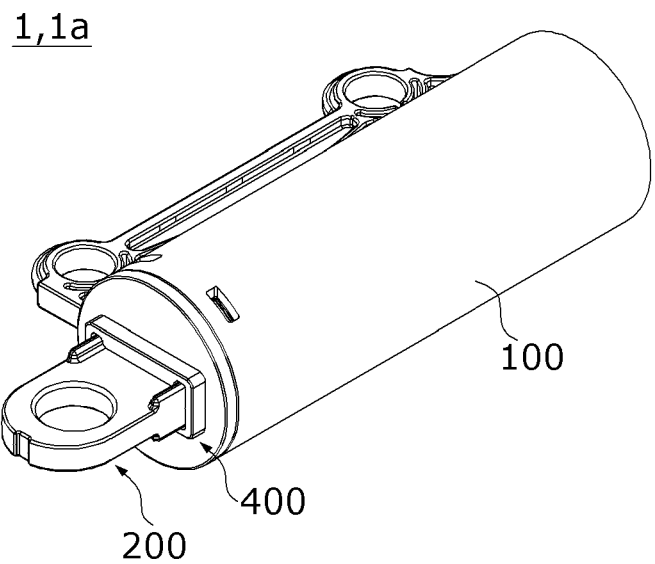
FIG. 4 is a perspective view illustrating the damper for a glove box according to the embodiment.

FIG. 1 is a view illustrating a glove box installed in a vehicle, FIG. 2 is a view illustrating a state in which a glove box is closed by a damper for a glove box according to an embodiment, FIG. 3 is a view illustrating a state in which the glove box is opened by the damper for a glove box according to the embodiment, and FIG. 4 is a perspective view illustrating the damper for a glove box according to the embodiment.

Referring to FIGS. 1 to 3, a glove box G for a vehicle may be installed in a dashboard DB in order to provide a storage space to a passenger who boards the vehicle. For example, in order to arrange the glove box G, a space may be formed in the dashboard DB. In addition, the glove box G may be rotatably disposed in the dashboard DB to open or close the space. In this case, the dashboard DB may be referred to as an instrument panel.

The glove box G may include a glove box body GB and a cover CB that form a storage space S therebetween and a damper 1 or 1a for a glove box according to the embodiment which controls a movement speed of the cover CB. In this case, the glove box body GB and the cover CB may be integrally formed.

The glove box body GB may be rotatably installed in the dashboard DB.

The cover CB may open or close the space according to rotation of the glove box body GB. In this case, the damper 1 or 1a may control the movement speed of the cover CB. In addition, for smooth rotation of the cover CB, a cylinder 100 of the damper 1 or 1a may be hinge-coupled to the dashboard DB, and a piston 200 of the damper 1 or 1a may be hinge-coupled to the glove box G. In this case, the damper 1 or 1a may be an air damper using air.

Meanwhile, a rotation speed of the cover CB may be determined by a load (a weight of the cover+a weight of an object accommodated in the glove box) applied to the cover CB and a damping force of the damper 1 or 1a. In this case, the damper 1 or 1a may control an opening speed of the cover CB. In this case, the opening speed of the cover CB may be the same as a movement speed of the piston 200 disposed in the damper 1 or 1a.

Accordingly, even when a load of the glove box G changes, the damper 1 or 1a for a glove box according to the embodiment may control a variable amount of a valve to prevent the opening speed of the cover CB from changing rapidly due to the change in the load. In this case, the variable amount may be controlled through an elastic support unit, a coupling structure between the piston 200 and the valve by which a size of an orifice is changed, a structure of the cylinder 100, and the like. In this case, a pressure difference may be generated between the inside and the outside of the cylinder 100 due to movement of the piston 200, and the valve may move due to the pressure difference.

Specifically, the damper 1 or 1a may maintain a constant movement speed of the cover CB within a predetermined range regardless of the weight of the object accommodated in the storage space S through the elastic support unit which generates elasticity according to movement of the valve and elastically supports the valve, the structure which changes the size of the orifice according to movement of the valve, and the like.

Various embodiments of the damper 1 or 1a for a glove box may be proposed according to the structure of the cylinder, the structure and a layout of the valve operating in conjunction with movement of the piston, the elastic support unit, and the like.

Hereinafter, since the various embodiments may be proposed according to the valve provided to the damper 1 or 1a and a structure of the valve or an elastic member included for elastically supporting the valve, the embodiments will be separately described according to the valve.

However, in order to improve productivity by sharing some parts of the damper 1 or 1a, some components of a damper 1 according to a first embodiment and some components of a damper 1a according to a second embodiment, which will be described below, may be formed to have the same shape and structure.

In addition, each of the damper 1 according to the first embodiment and the damper 1a according to the second embodiment may handle a light load to a heavy load of the glove box G only by changing a coupling position of the valve. Accordingly, a range of the load of the glove box G applied to the damper 1 or 1a can be improved. Accordingly, the damper 1 or 1a may handle a wide range of the load applied to the cover CB even with a small production cost.

First Embodiment

Figure 5:
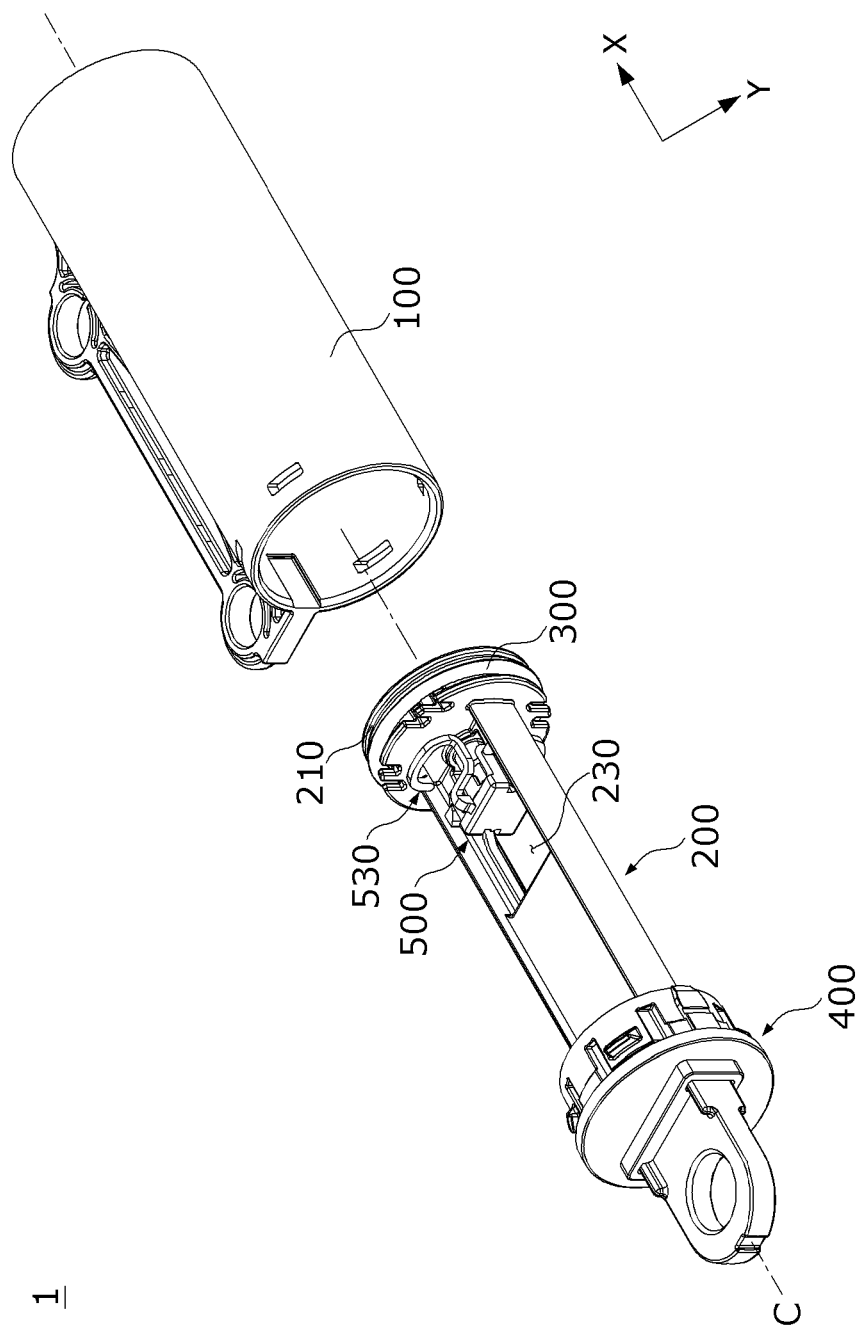
FIG. 5 is an exploded perspective view illustrating a damper for a glove box according to a first embodiment.
Figure 6:
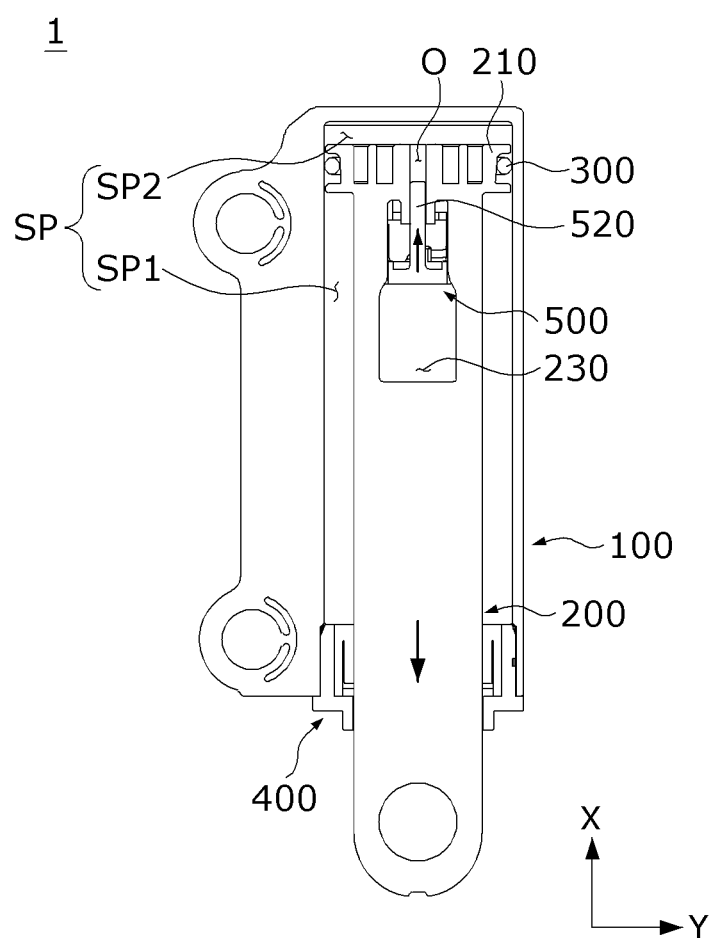
FIG. 6 is a cross-sectional view illustrating the damper for a glove box according to the first embodiment.
Figure 7:
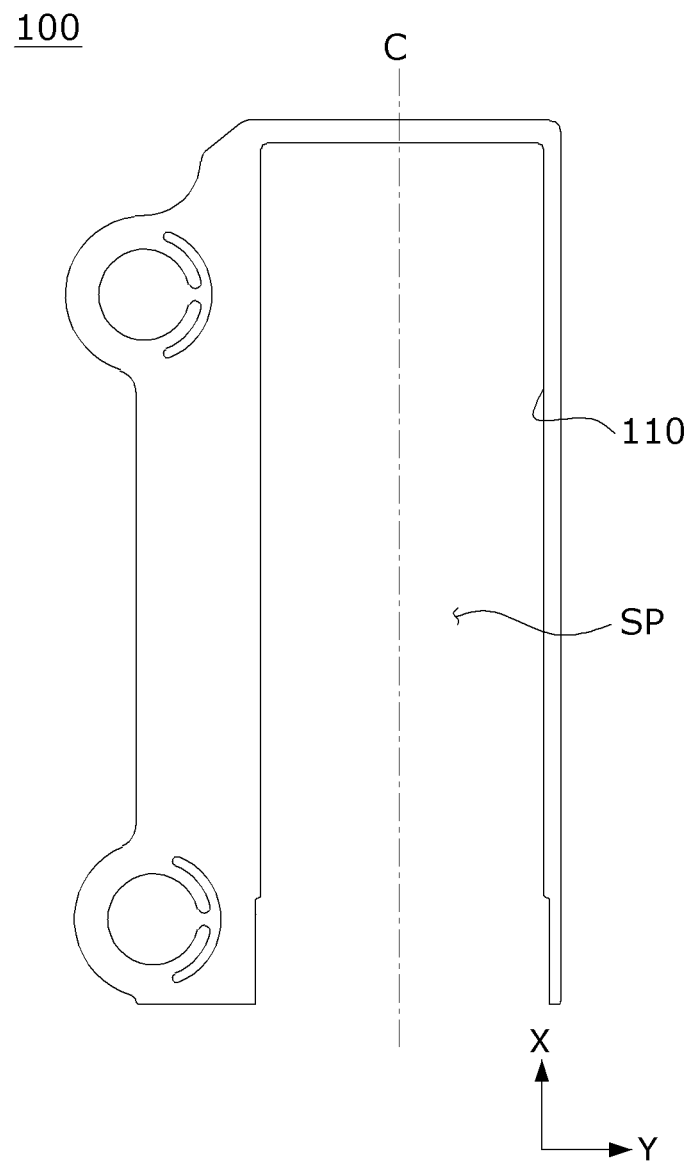
FIG. 7 is a cross-sectional view illustrating a cylinder of the damper for a glove box according to the embodiment.
Figure 8:
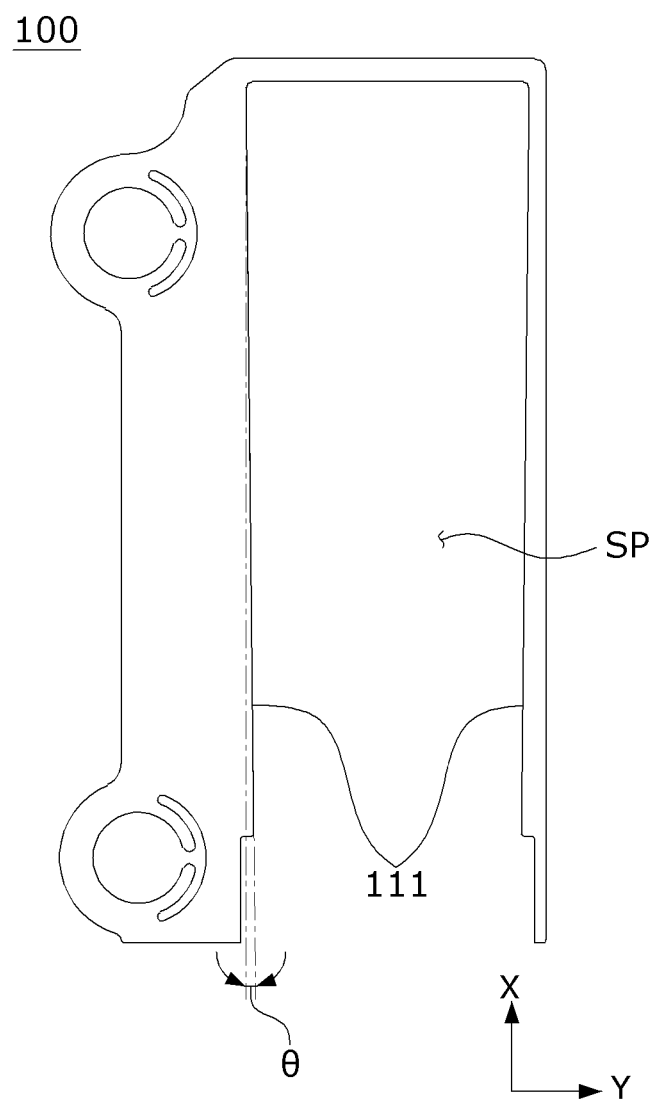
FIG. 8 is a cross-sectional view illustrating a modified example of the cylinder disposed in the damper for a glove box according to the embodiment.

FIG. 5 is an exploded perspective view illustrating a damper for a glove box according to a first embodiment, FIG. 6 is a cross-sectional view illustrating the damper for a glove box according to the first embodiment, FIG. 7 is a cross-sectional view illustrating a cylinder of the damper for a glove box according to the embodiment, and FIG. 8 is a cross-sectional view illustrating a modified example of the cylinder disposed in the damper for a glove box according to the embodiment;

In this case, an X direction illustrated in FIGS. 5 to 8 may be a first direction, a movement direction, a longitudinal direction, or a vertical direction in the drawings, and a Y direction may be a second direction, a width direction, or a horizontal direction in the drawings. In addition, the X direction may be divided into a forward direction in which a glove box G is opened and a rearward direction in which the glove box G is closed. In addition, the X direction and the Y direction may be perpendicular to each other. In addition, a reference symbol "C" may be a center of a damper 1 or valve 500 and may be disposed in a direction which is the same as the X direction.

Referring to FIGS. 5 and 6, the damper 1 according to the first embodiment may include a cylinder 100 in which an opening is formed at one side and which has a cylindrical shape, a piston 200 movably disposed in a space SP formed in the cylinder 100, a sealing member 300 disposed between an inner surface of the cylinder 100 and the piston 200, a cap 400 disposed to cover the opening of the cylinder 100, and a valve 500 movably disposed in an accommodation portion of the piston 200. In this case, the space SP may be divided into a first space SP1 and a second space SP2 by a piston body 210 of the piston 200. In this case, the piston body 210 may include an orifice O passing therethrough in the first direction so that the first space SP1 communicates with the second space SP2.

As the piston 200 moves forward in the first direction, a pressure difference may be generated between the first space SP1 and the second space SP2. In addition, the valve 500 may move rearward due to the pressure difference. That is, the valve 500 may move due to the movement of the piston 200 in a direction opposite to a movement direction of the piston 200. In this case, a pin 520 of the valve 500 may adjust a volume of an interior of the orifice O to prevent an opening speed of the cover CB from changing rapidly due to a change in load of the glove box G.

In addition, since the valve 500 may be elastically supported by legs 530 in contact with the piston body 210, the sudden change in the opening speed of the cover CB can be prevented. In this case, the legs 530 may be formed as elastic structures which are in contact with and pressed by the piston body 210.

The cylinder 100 may have a rectangular member of which a length in the first direction is greater than a length in the second direction.

In addition, the cylinder 100 may be formed in the cylindrical shape in which the opening is formed at one side and the space SP is formed. For example, the cylinder 100 may be formed in the cylindrical shape having a predetermined radius about a center C in the second direction. Accordingly, the cylinder 100 may include an inner surface 110. In addition, the sealing member 300 may be in contact with the inner surface 110.

Referring to FIG. 8, the space SP formed in the cylinder 100 may also be formed in a tapered shape. For example, the space SP may be formed in the tapered shape of which a cross-sectional area decreases toward the opening from one end of the cylinder 100. Accordingly, the inner surface 110 of the cylinder 100 may include an inclined surface 111 having a predetermined inclination angle A in the first direction.

Accordingly, as the piston 200 moves in a direction in which the cap 400 is disposed, a friction force between the sealing member 300 disposed on the piston 200 and the inclined surface 111 may increase, and a movement speed of the piston 200 may gradually decrease. In addition, a decrease in the movement speed may assist with smooth opening of the glove box G.

As illustrated in FIG. 8, an example of the inclined surface 111 formed on the entire inner surface 110 is illustrated, but the present disclosure is not necessarily limited thereto. For example, the inclined surface 111 may also be formed on a part of the inner surface 110. Specifically, the inclined surface 111 may also be formed at only a front side of the inner surface 110.

Figure 9:
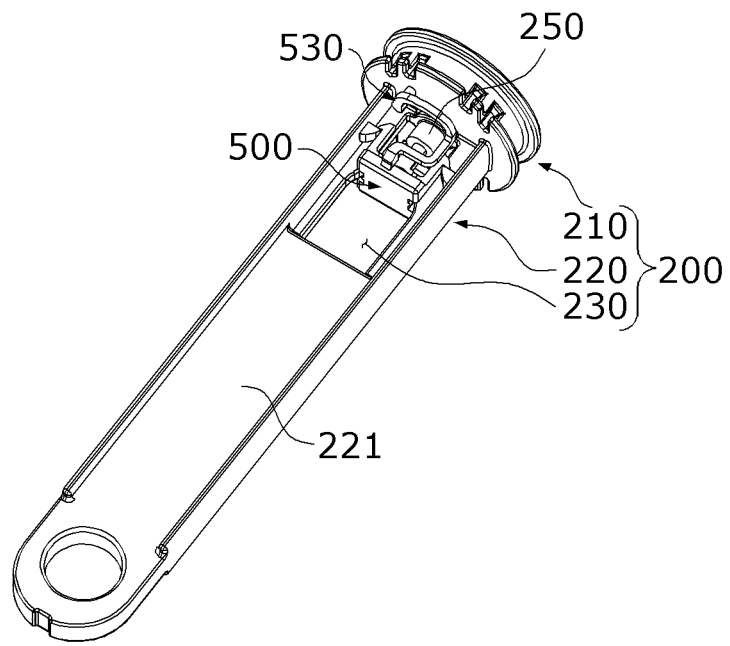
FIG. 9 is a perspective view illustrating a layout of a piston and a valve which are disposed in the damper for a glove box according to the first embodiment.
Figure 10:
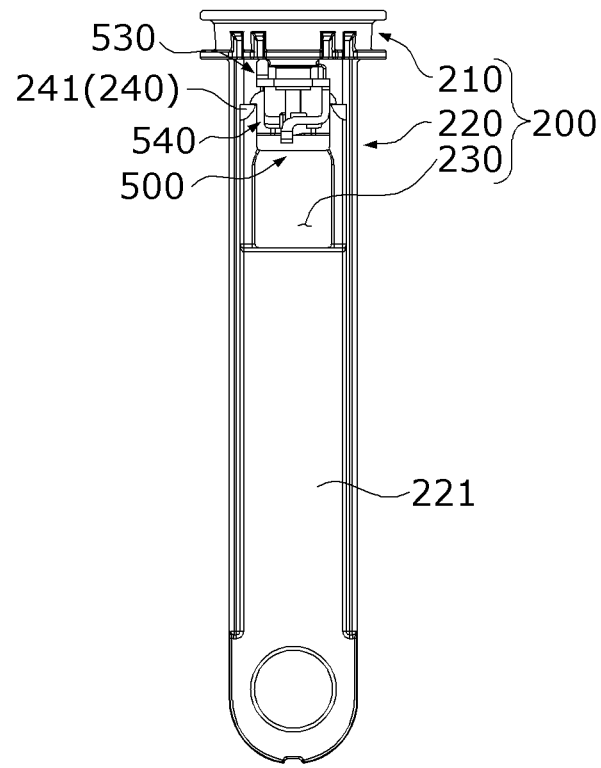
FIG. 10 is a front view illustrating the layout of the piston and the valve which are disposed in the damper for a glove box according to the first embodiment.
Figure 11:
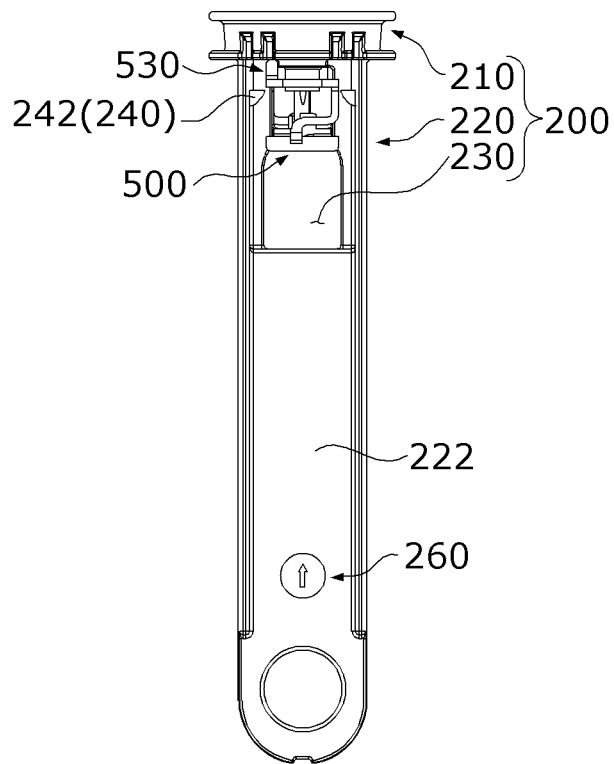
FIG. 11 is a rear view illustrating the layout of the piston and the valve which are disposed in the damper for a glove box according to the first embodiment.
Figure 12:
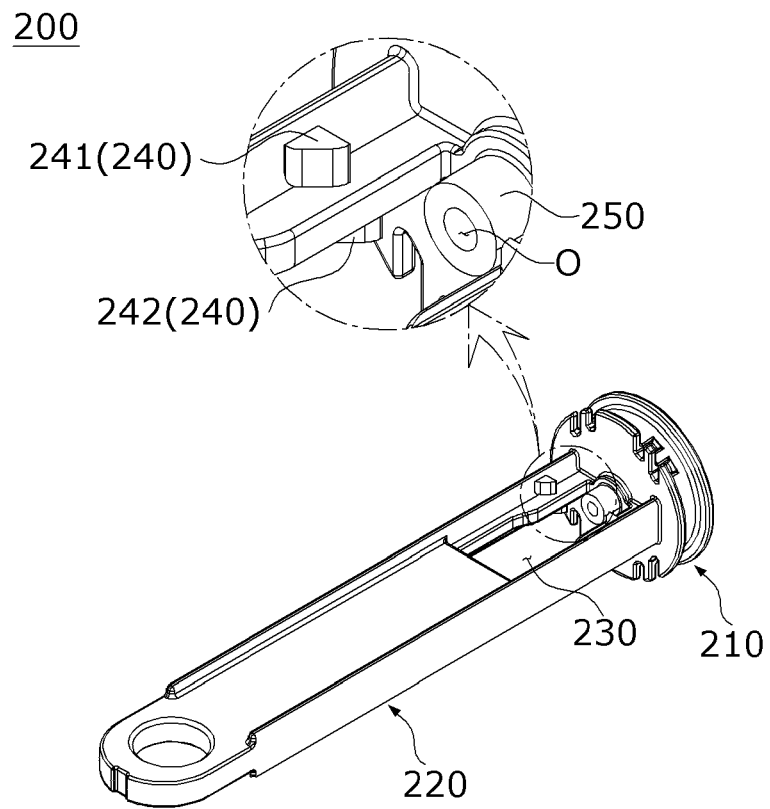
FIG. 12 is a perspective view illustrating the piston disposed in the damper for a glove box according to the embodiment.
Figure 13:
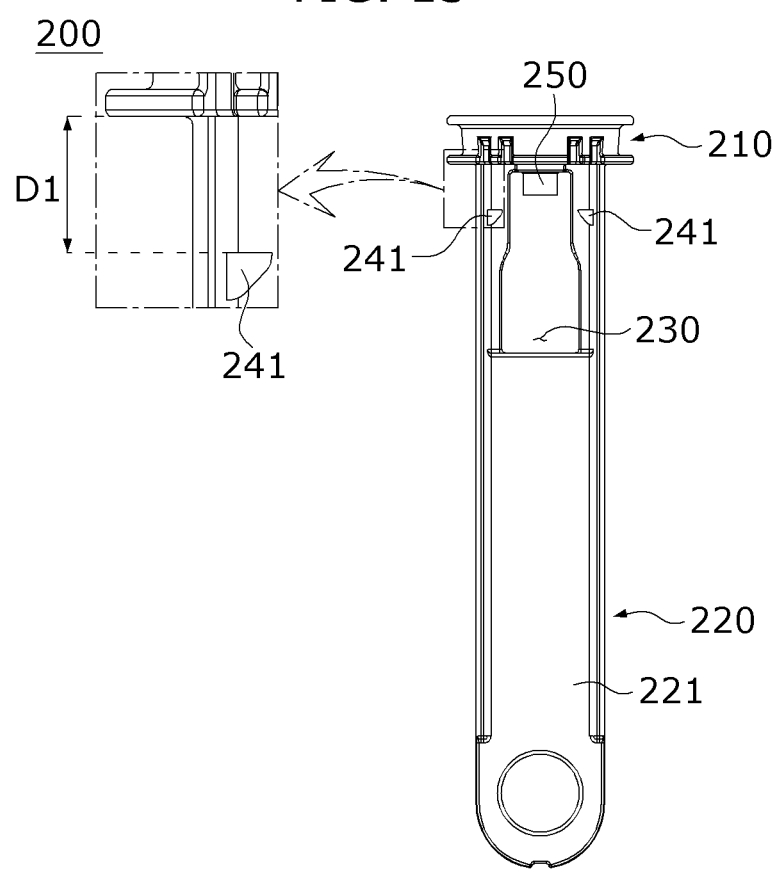
FIG. 13 is a front view illustrating the piston disposed in the damper for a glove box according to the embodiment.
Figure 14:
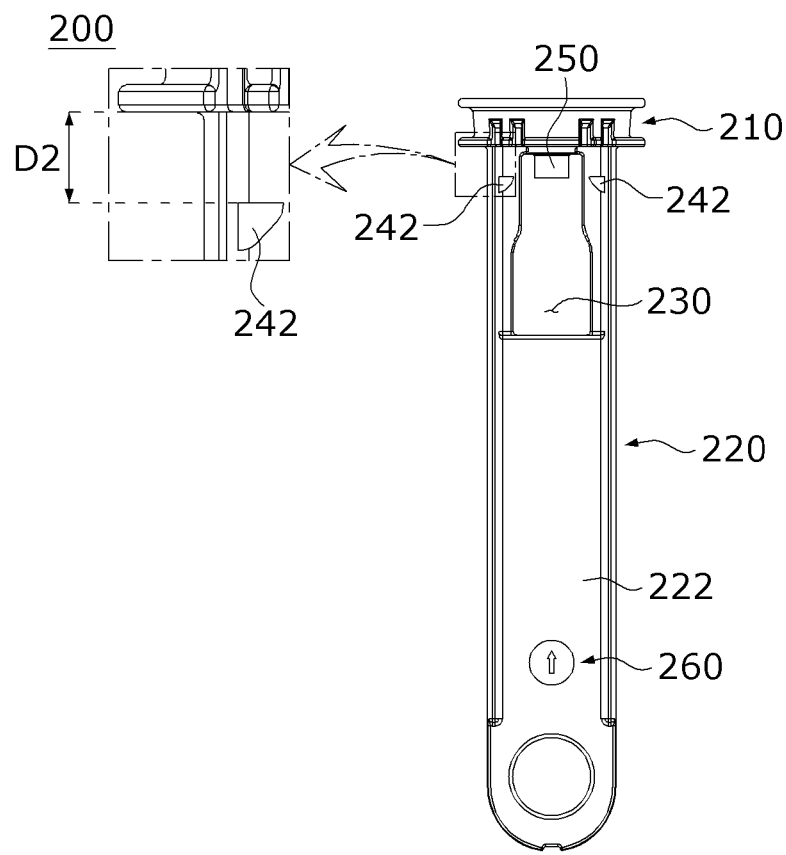
FIG. 14 is a rear view illustrating the piston disposed in the damper for a glove box according to the embodiment.
Figure 15:
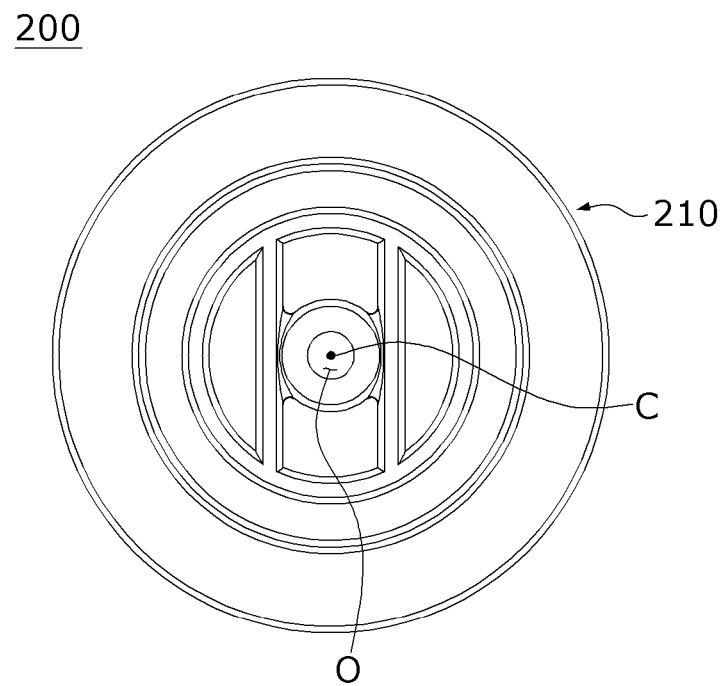
FIG. 15 is a plan view illustrating the piston disposed in the damper for a glove box according to the embodiment.
Figure 16:
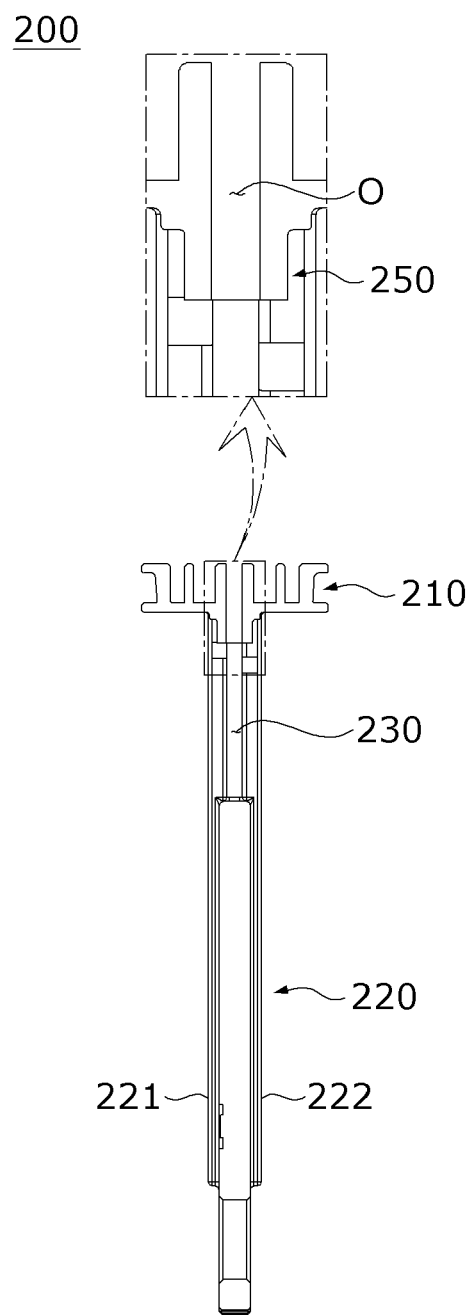
FIG. 16 is a cross-sectional view illustrating the piston disposed in the damper for a glove box according to the embodiment.

FIG. 9 is a perspective view illustrating a layout of the piston and the valve which are disposed in the damper for a glove box according to the first embodiment, FIG. 10 is a front view illustrating the layout of the piston and the valve which are disposed in the damper for a glove box according to the first embodiment, FIG. 11 is a rear view illustrating the layout of the piston and the valve which are disposed in the damper for a glove box according to the first embodiment, FIG. 12 is a perspective view illustrating the piston disposed in the damper for a glove box according to the embodiment, FIG. 13 is a front view illustrating the piston disposed in the damper for a glove box according to the embodiment, FIG. 14 is a rear view illustrating the piston disposed in the damper for a glove box according to the embodiment, FIG. 15 is a plan view illustrating the piston disposed in the damper for a glove box according to the embodiment, and FIG. 16 is a cross-sectional view illustrating the piston disposed in the damper for a glove box according to the embodiment.

Referring to FIGS. 9 to 11, the valve 500 may be movably disposed in an accommodation portion 230 of the piston 200 in the first direction. For example, as the piston 200 moves forward in the first direction, the valve 500 may move in a direction opposite to the movement direction of the piston 200. In addition, the legs 530 of the valve 500 may come into contact with one surface of the piston body 210 due to the movement of the valve 500.

Referring to FIGS. 12 to 16, the piston 200 may include the piston body 210 in which the orifice O is formed, a rod 220 formed to protrude from a lower surface of the piston body 210 in the first direction, the accommodation portion 230 formed in the rod 220, stoppers 240 formed in the rod 220, and a protruding portion 250 formed to protrude from the piston body to allow the orifice O to extend.

In addition, the piston 200 may include a recognition part 260 disposed on any one surface of a first surface 221 and a second surface 222 of the rod 220.

The piston body 210 may move along the inner surface 110 in the first direction

In addition, the piston body 210 may be formed in a disc or cylindrical shape.

In addition, the piston body 210 may include the orifice O passing therethrough in the first direction so that the first space SP1 communicates with the second space SP2. Accordingly, the orifice O may allow the first space SP1 and the second space SP2 to communicate with each other to allow air to flow between the first space SP1 and the second space SP2.

In addition, the pin 520 of the valve 500 may be movably disposed in the orifice O. In this case, since the pin 520 may be formed in a shape of which a cross-sectional area decreases toward an end portion thereof, a volume of the pin 520 in the orifice O can change according to a position of the pin 520. That is, a ventilation cross-sectional area of the orifice O may change according to the position of the pin 520.

In addition, the piston body 210 may include a groove concavely formed inward in an outer circumferential surface thereof, and the sealing member 300 may be disposed in the groove. In this case, the term "inward" may refer to a direction toward the center C in the second direction, and the term "outward" may refer to a direction opposite to "inward."

The rod 220 may be integrally formed with the piston body 210 and formed to protrude from one surface of the piston body 210 in the first direction. For example, the rod 220 may be formed to protrude from one surface of the piston body 210 toward the cap 400.

In addition, the rod 220 may be provided as a rectangular member of which a length is greater than a width and formed in a bar shape including the first surface 221 and the second surface 222.

In addition, an end portion of the rod 220 may be exposed to the outside. In addition, the exposed end portion of the rod 220 may be hinge-coupled to the glove box G. Accordingly, the piston rod 220 may move linearly in conjunction with rotation of the glove box G. In addition, a pressure difference may be generated in the cylinder 100 due to the piston body 210 moving in conjunction with the movement of the piston rod 220. Accordingly, an opening speed of the glove box G may be changed according to a movement speed of the piston 200.

The accommodation portion 230 may be disposed in the rod 220. In addition, the valve 500 may be movably disposed in the accommodation portion 230. In this case, the accommodation portion 230 may be provided as a hole passing through from the first surface 221 to the second surface 222. For example, the accommodation portion 230 may be the hole having a predetermined width in the first direction. Accordingly, the accommodation portion 230 may be referred to as an accommodation hole.

The stoppers 240 may be disposed in the rod 220 and restrict a movement range of the valve 500. For example, the stoppers 240 may be disposed in the rod 220 to correspond to hooks 540 of the valve 500 to restrict movement of the valve 500. That is, the stoppers 240 may restrict a stroke which is the movement range of the valve 500 in the first direction to restrict a variable amount of the valve 500 in the first direction. In this case, in the damper 1, at least two stoppers 240 of which positions are different may be used so that the valve 500 is properly used for a load.

Referring to FIGS. 10, 11, 13, and 14, each of the stoppers 240 may include a first stopper 241 disposed at a side of the first surface 221 of the rod 220 and a second stopper 242 disposed at a side of the second surface 222 of the rod 220.

In this case, the first stopper 241 and the second stopper 242 may be disposed to have different separation distances from one side of the piston body 210. For example, a first separation distance D1 from the piston body 210 to the first stopper 241 may be greater than a second separation distance D2 from the piston body 210 to the second stopper 242.

When each of the hooks 540 of the valve 500 is disposed to correspond to the first stopper, the first stopper 241 may be disposed in a movement direction of the hook 540 of the valve 500 to restrict movement of the hook 540. In this case, the first stopper 241 may be disposed to have the first separation distance D1 from the lower surface of the piston body 210.

In addition, the first stopper 241 may be provided as a protrusion formed to protrude from the first surface 221 of the rod 220. Accordingly, the first stopper 241 may be referred to as a first protrusion.

In addition, two first stoppers 241 may be disposed on the first surface 221 to face each other. Accordingly, since each of the hooks 540 of the valve 500 may be supported by one of the first stoppers 241, the first stoppers 241 may prevent tilting of the valve 500.

In addition, the first stopper 241 may be disposed in the movement direction of the hook 540 of the valve 500 to restrict movement of the hook 540. In this case, the first stopper 241 may be disposed to have the first separation distance D1 from the lower surface of the piston body 210.

Meanwhile, when the hook 540 of the valve 500 is disposed to correspond to the second stopper 242, the second stopper 242 may be disposed in the movement direction of the hook 540 of the valve 500 to restrict movement of the hook 540. In this case, the second stopper 242 may be disposed to have the second separation distance D2 from the lower surface of the piston body 210.

In addition, the second stopper 242 may be provided as a protrusion formed to protrude from the second surface 222 of the rod 220. Accordingly, the second stopper 242 may be referred to as a second protrusion.

In addition, two second stoppers 242 may be disposed on the second surface 221 to face each other. Accordingly, since each of the hooks 540 of the valve 500 may be supported by one of the second stoppers 242, the second stoppers 242 may prevent tilting of the valve 500.

In addition, the second stopper 242 may be disposed in the movement direction of the hook 540 of the valve 500 to restrict movement of the hook 540. In this case, the second stopper 242 may be disposed to have the second separation distance D2 from the lower surface of the piston body 210.

Meanwhile, since the first stopper 241 and the second stopper 242 may be disposed to have different distances from one side of the piston body 210, the hook 540 of the valve 500 may be disposed to handle a load of any one of the first stopper 241 and the second stopper 242 applied to the cover CB.

In this case, a position at which the hook 540 is disposed may be determined according to a damping force to be provided by the damper 1. For example, when the glove box G is light, the hook 540 may be disposed to correspond to the first stopper 241. In addition, when the glove box G is heavy, the hook 540 may be disposed to correspond to the second stopper 242. In this case, ranges of a light load and a heavy load may be provided as values of predetermined ranges.

The protruding portion 250 may be formed in the accommodation portion 230 to allow the orifice O to extend. For example, the protruding portion 250 may be formed in a cylindrical shape of which a cross section has a ring shape and formed to protrude toward the valve 500. In this case, a protruding length of the protruding portion 250 in the first direction may be smaller than the second separation distance D2. Accordingly, the protruding portion 250 may allow the orifice O to extend in the first direction. In this case, the protruding portion 250 may be referred to as a sleeve or boss.

In addition, the pin 520 of the valve 500 may be movably disposed in the protruding portion 250. In this case, the protruding portion 250 may support the pin 520 in a horizontal direction.

The recognition part 260 allows recognition of whether the valve 500 is disposed at a proper position to handle the load of the cover CB.

The recognition part 260 may be disposed on any one surface of the first surface 221 and the second surface 222. For example, the recognition part 260 may be disposed on only the second surface 222.

Accordingly, when the recognition part 260 disposed on the second surface 222 and the hook 540 of valve 500 are seen together, it can be seen that the valve 500 is disposed to handle a heavy load.

The sealing member 300 may be disposed in the groove formed in the piston body 210. In addition, an outer side of the sealing member 300 may be in contact with the inner surface 110.

In this case, the sealing member 300 may be formed of an elastic material such as rubber. Accordingly, the sealing member 300 may be pressed against the inner surface 110. In this case, an O-ring may be provided as the sealing member 300.

Meanwhile, a lubricant such as grease may be applied on the inner surface 110 of the cylinder 100. Accordingly, friction between the sealing member 300 and the inner surface of the cylinder 100 may decrease.

The cap 400 may be disposed to cover the opening formed at one end portion of the cylinder 100.

In addition, the cap 400 may include a hole formed to guide movement of the rod 220.

The valve 500 may be movably disposed in the accommodation portion 230.

In addition, the valve 500 may adjust a damping force of the damper 1 while moving in the first direction due to movement of the piston 200. For example, the valve 500 may adjust an amount of air flowing through the orifice O using a position of the valve 500 in the first direction. In addition, the position of the valve 500 in the first direction may be adjusted through the elastic structures using the legs 530. Accordingly, the valve 500 may be referred to as a position variable valve.

In addition, the valve 500 may be formed of rubber or a synthetic resin material with a predetermined hardness. However, even when the valve 500 is formed of a material with a predetermined hardness such as plastic, the valve 500 may be elastically supported by the elastic structures, such as the legs 530, which generate an elastic force.

Figure 18:
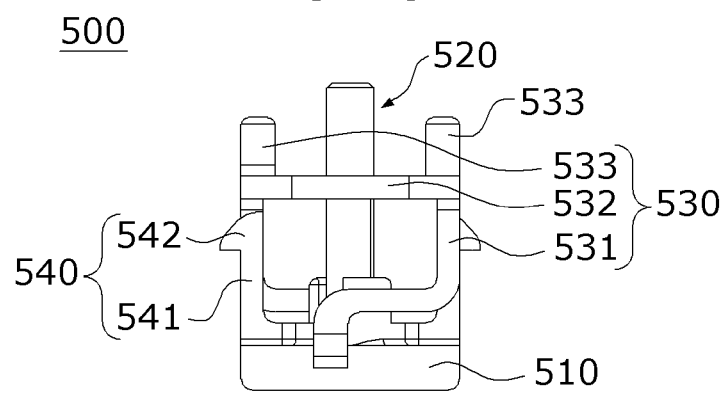
FIG. 18 is a front view illustrating the valve of the damper for a glove box according to the first embodiment.
Figure 19:
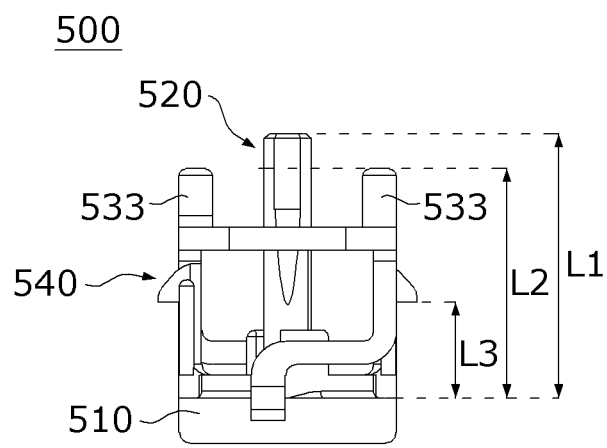
FIG. 19 is a rear view illustrating the valve of the damper for a glove box according to the first embodiment.
Figure 20:
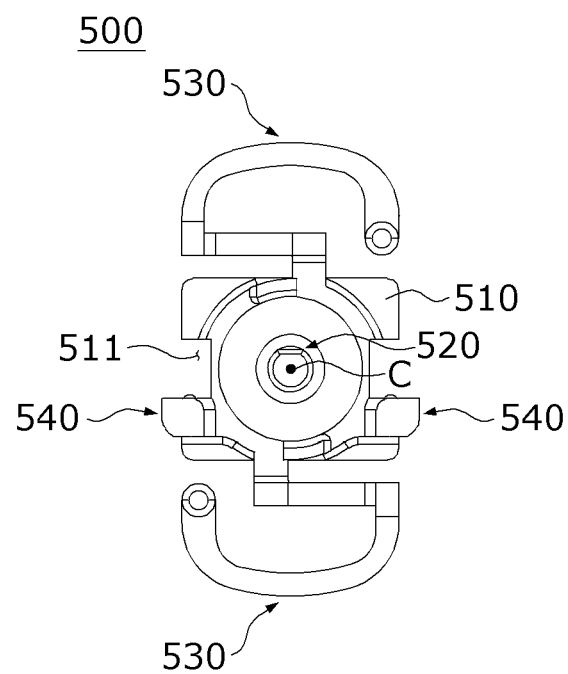
FIG. 20 is a plan view illustrating the valve of the damper for a glove box according to the first embodiment.
Figure 21:
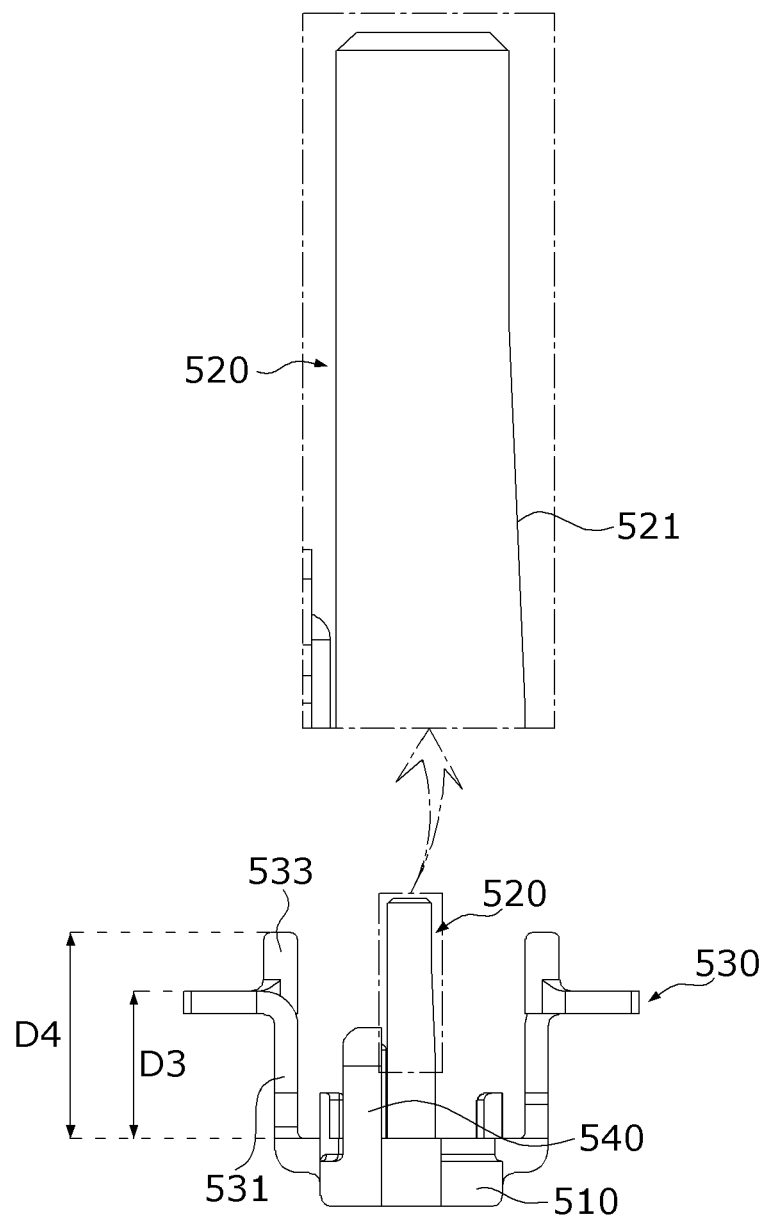
FIG. 21 is a side view illustrating the valve of the damper for a glove box according to the first embodiment.

FIG. 18 is a front view illustrating the valve of the damper for a glove box according to the first embodiment, FIG. 19 is a rear view illustrating the valve of the damper for a glove box according to the first embodiment, FIG. 20 is a plan view illustrating the valve of the damper for a glove box according to the first embodiment, and FIG. 21 is a side view illustrating the valve of the damper for a glove box according to the first embodiment.

Referring to FIGS. 18 to 21, the valve 500 may include the valve body 510 having a plate shape, the pin 520 formed to protrude from the valve body 510 in the first direction so that the end portion thereof is disposed in the orifice O, and the legs 530 formed to protrude from the valve body 510 in the first direction. In this case, the pin 520 and the legs 530 may be disposed apart from each other in the horizontal direction.

In addition, the valve 500 may include the hooks 540 disposed to correspond to the stoppers. In this case, the valve body 510, the pin 520, the legs 530, and the hooks 540 may be integrally formed.

Meanwhile, the valve body 510, the pin 520, the legs 530, and the hooks 540 may be integrally formed. Accordingly, the valve 500 may be provided as a single part. In addition, the position at which the valve 500 is disposed may be changed to handle the load of the cover GC so that the valve 500 may be shared.

The valve body 510 may be formed in a plate shape including an upper surface, a lower surface, and an outer side surface connecting the upper surface and the lower surface.

In addition, the valve body 510 may include grooves 511 concavely formed in the outer side surface thereof, and the grooves 511 may be coupled to guides formed in the accommodation portion 230. Accordingly, the valve 500 may be guided by the guides using the grooves 511.

The pin 520 may be formed to protrude from the upper surface of the valve body 510 in the first direction. In this case, the pin 520 may be formed to have a first length L1 in the first direction. In this case, a reference of the first length L1 may be the upper surface of the valve body 510. In addition, the first length L1 of the pin 520 may be referred to as a first protruding length or first height.

In addition, the pin 520 may be formed in a cylindrical shape and disposed in a central portion of the valve body 510.

In addition, the pin 520 may be movably disposed in the orifice O. Accordingly, the end portion of the pin 520 may change a size of the orifice O while moving in the orifice O in the first direction. In addition, a damping force of the damper 1 may be adjusted by the orifice O of which the size is changed.

Accordingly, since the valve 500 may move in the first direction due to movement of the piston 200, and a position of the end portion of the pin 520 is changed in the orifice O due the movement, a ventilation cross-sectional area of air passing through the orifice O may also change.

In addition, the pin 520 may be formed in a shape of which a cross-sectional area decreases toward the end portion thereof.

Figure 17:
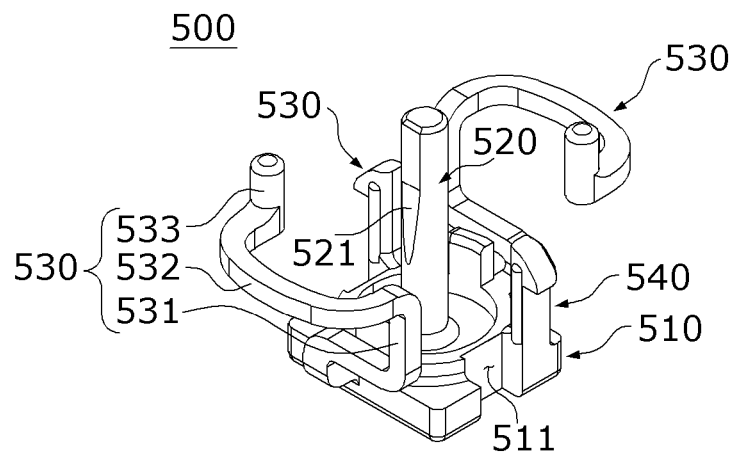
FIG. 17 is a perspective view illustrating the valve of the damper for a glove box according to the first embodiment.

As illustrated in FIGS. 17 and 21, the pin 520 may include an inclined surface 521 having a predetermined inclination. Accordingly, the pin 520 may be implemented to have the shape of which the cross-sectional area decreases toward the end portion using the inclined surface 521. In this case, an example of the pin 520 in which the inclined surface 521 is formed on a part thereof is described, but the present disclosure is not necessarily limited thereto. For example, the pin 520 may also be formed in a tapered shape.

Each of the leg 530 may be formed to protrude from the upper surface of the valve body 510 in the first direction. In this case, the legs 530 may be formed to have a second length L2 in the first direction. In this case, a reference of the second length L2 may be the upper surface of the valve body 510. In addition, the second length L2 of the leg 530 may be referred to as a second protruding length or second height.

In this case, the second length L2 of the leg 530 may be smaller than the first length L1 of the pin 520. That is, the first length L1 of the pin 520 may be greater than the second length L2 of the leg 530. Accordingly, when the pin 520 is inserted into the orifice O, interference of the leg 530 can be minimized.

In addition, the leg 530 may include a first region 531 formed to protrude from the valve body 510 in the first direction, a second region 532 extending from an end portion of the first region 531 in the second direction, and a third region 533 extending to protrude from an end portion of the second region 532 in the first direction. In this case, the second direction may be a direction different from the first direction. For example, the first direction may be the vertical direction, and the second direction may be the horizontal direction.

Referring to FIGS. 17 and 21, a distance D3 from the valve body 510 to the end portion of the first region 531 in the first direction may be smaller than a distance D4 from the valve body 510 to an end portion of the third region 533 in the first direction. Accordingly, due to movement of the valve 500, the end portion of the third region 533 comes into contact with the piston body 210, and the end portion of the first region 531 comes into contact with the piston body 210.

Accordingly, a support force in a case in which both the first region 531 and the third region 533 come into contact with the piston body 210 increases when compared to a case in which only the end portion of the third region 533 comes into contact with the piston body 210. That is, since a repulsive force increases due to two-point contact with the valve 500, the damper 1 may generate a greater damping force.

Meanwhile, the plurality of legs 530 may be formed. In addition, the plurality of legs 530 may be disposed to be rotationally symmetrical with respect to a center C of the valve body 510. For example, at least two legs 530 may be disposed to be rotationally symmetrical with respect to the center C of the valve body 510. Accordingly, the plurality of legs 530 may generate a constant elastic force.

The hook 540 may be formed to protrude from the upper surface of the valve body 510 in the first direction. In this case, the hook 540 may be formed to have a third length L3 in the first direction. In addition, the third length L3 may be smaller than the second length L2 of the leg 530.

The hook 540 may include a hook body 541 formed to protrude in the first direction and a hook portion 542 formed to protrude from the hook body 541 in the second direction. In this case, the hook portion 542 may be referred to as a hook protruding portion or second protruding portion.

In addition, movement of one side of the hook portion 542 may be restricted while one side of the hook portion 542 comes into contact with the stopper 240. For example, when the valve 500 moves, the movement of the valve 500 may be restricted by the stopper 240 disposed in the movement direction of the hook 540.

The hook portion 542 may be disposed between the piston body 210 and the first stopper 241 or between the piston body 210 and the second stopper 242 to handle the load applied to the cover GC. For example, the hook portion 542 may be disposed to overlap the first stopper 241 in the first direction or the second stopper 242 in the first direction. Accordingly, when the valve 500 moves, the movement of the valve 500 may be restricted while the stopper 240 disposed in a movement direction of the hook portion 542 comes into contact with the hook portion 542.

Accordingly, the damper 1 may easily handle the load applied to the cover GC only by arranging the hook 540 in the shared valve 500.

Figure 22:
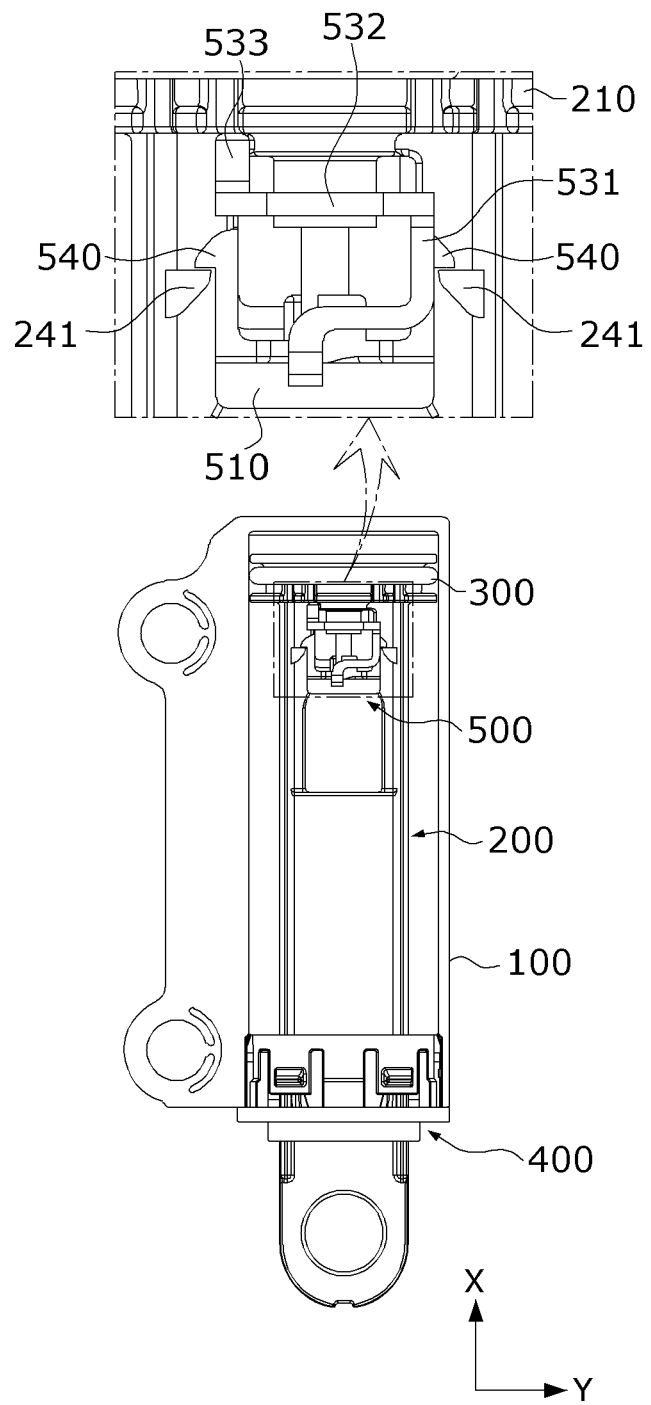
FIGS. 22 and 23 are views illustrating operation of the damper for a glove box according to the first embodiment when a glove box is light.
Figure 23:
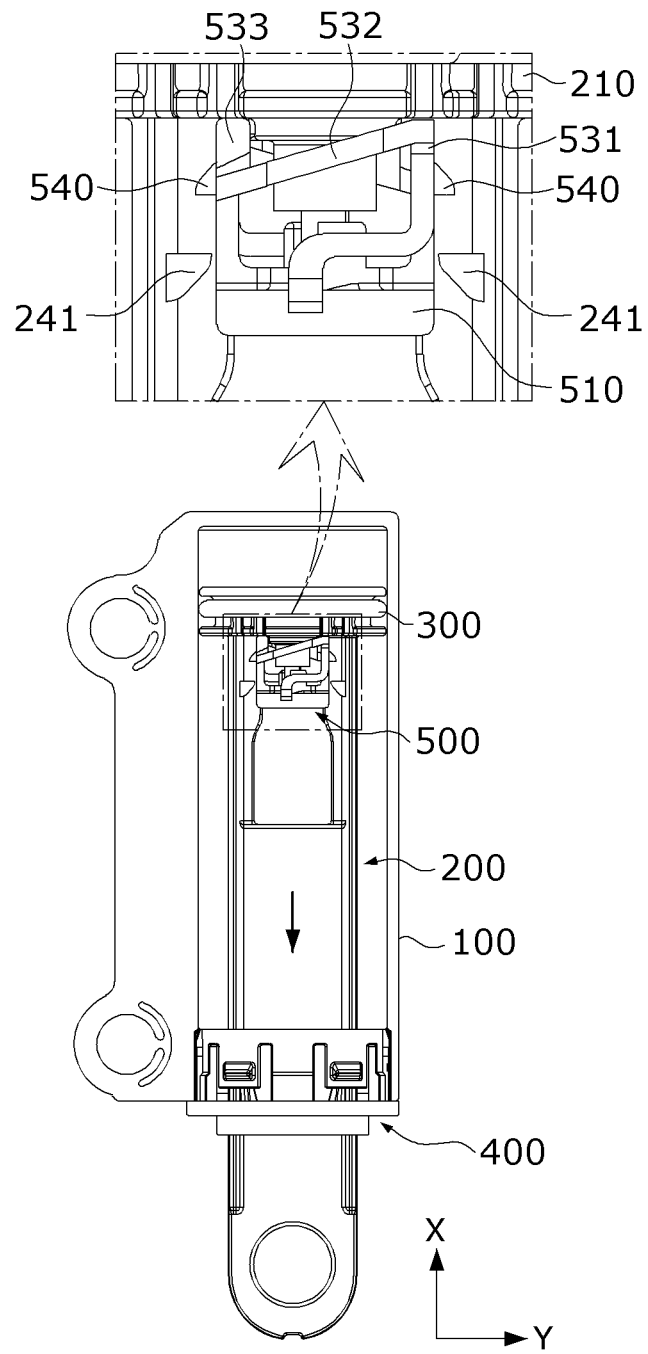

FIGS. 22 and 23 are views illustrating operation of the damper for a glove box according to the first embodiment when a glove box is light, wherein FIG. 22 is a view illustrating a position of the valve 500 when the glove box is closed, and FIG. 23 is a view illustrating a position of the valve 500 when the glove box is opened.

Referring to FIGS. 22 and 23, the valve 500 moves due to movement of the piston 200. Accordingly, while the leg 530 of the valve 500 comes into contact with and is pressed by the piston body 210, a shape of the leg 530 changes. In addition, an elastic force of the leg 530 generated according to the change in the shape is one factor in generation of a damping force of the damper 1. In this case, the hook 540 may be disposed to correspond to the first stopper 241.

Due to movement of the valve 500, both the first region 531 and the third region 533 of the valve 500 may come into contact with the piston body 210. Accordingly, since a repulsive force increases due to two-point contact with the valve 500, the damper 1 may generate a greater damping force.

Figure 24:
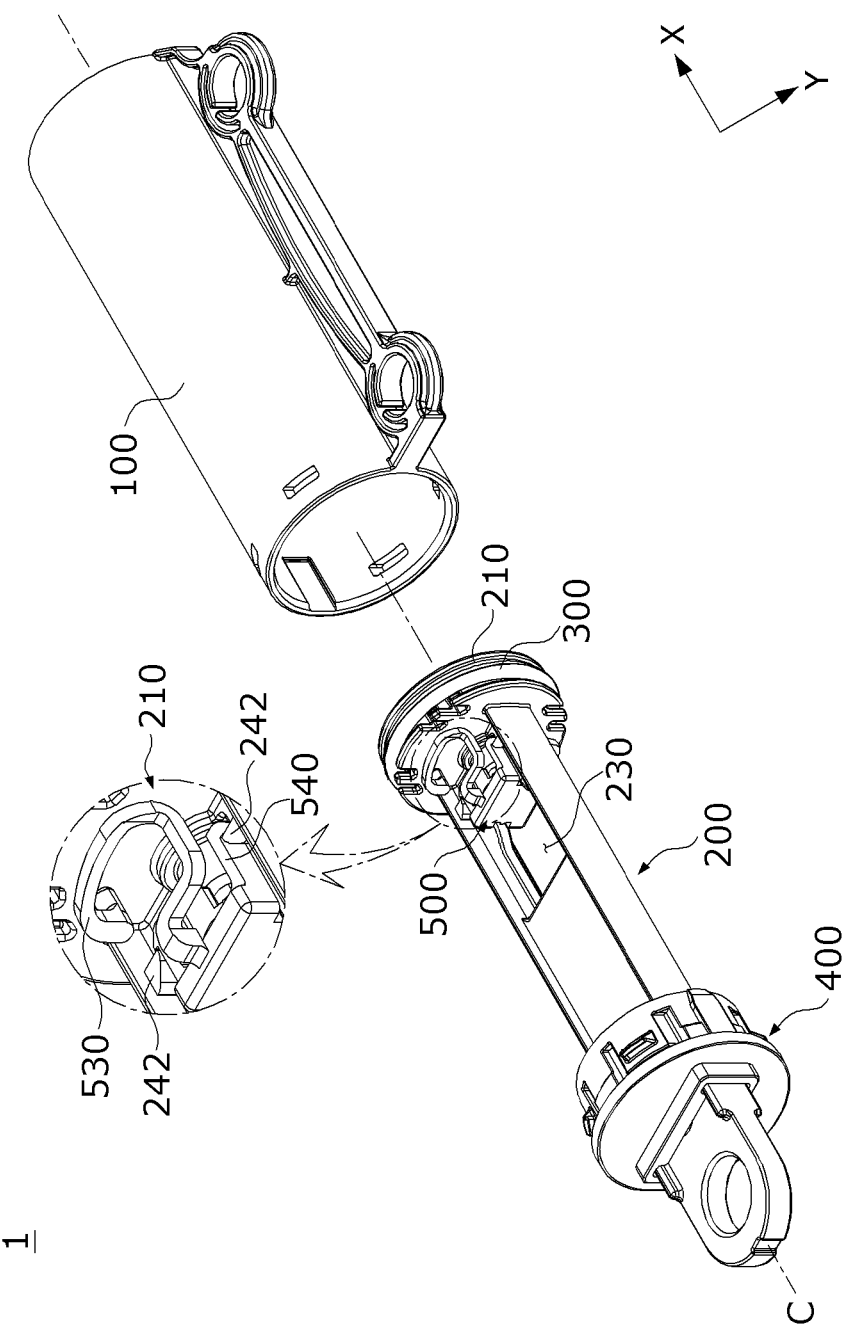
FIG. 24 is an exploded perspective view illustrating the damper for a glove box according to the first embodiment when a hook of the valve is disposed to correspond to a second stopper.
Figure 25:
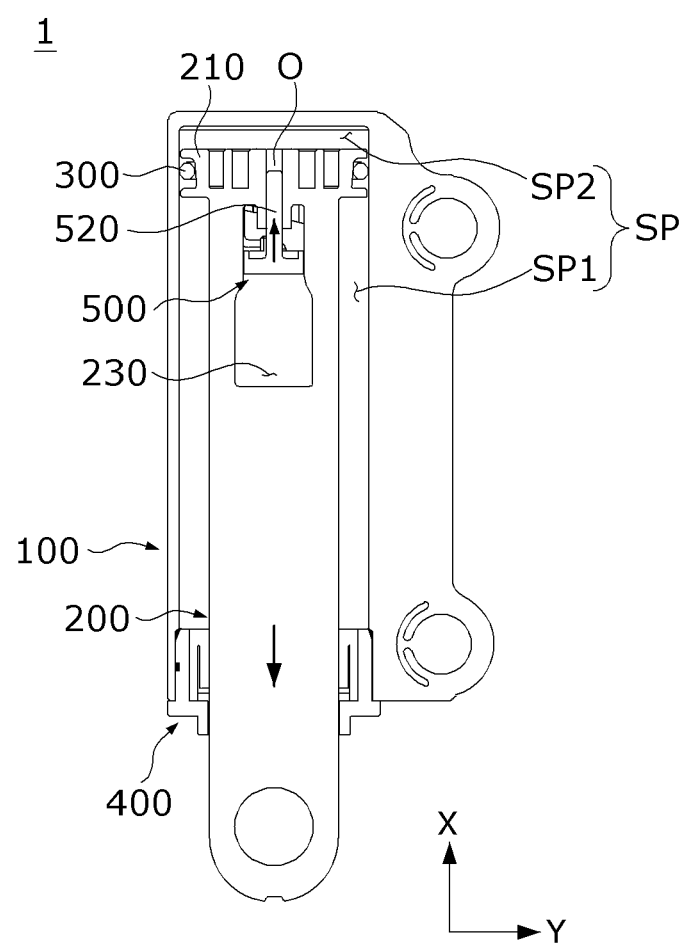
FIG. 25 is a cross-sectional view illustrating the damper for a glove box according to the first embodiment when the hook of the valve is disposed to correspond to the second stopper.

FIG. 24 is an exploded perspective view illustrating the damper for a glove box according to the first embodiment when the hook of the valve is disposed to correspond to the second stopper, and FIG. 25 is a cross-sectional view illustrating the damper for a glove box according to the first embodiment when the hook of the valve is disposed to correspond to the second stopper;

Referring to FIGS. 24 to 25, the hook 540 of the valve 500 may be disposed to correspond to the second stopper 242. Accordingly, the damper 1 may handle a case in which the glove box G is heavy.

Figure 26:
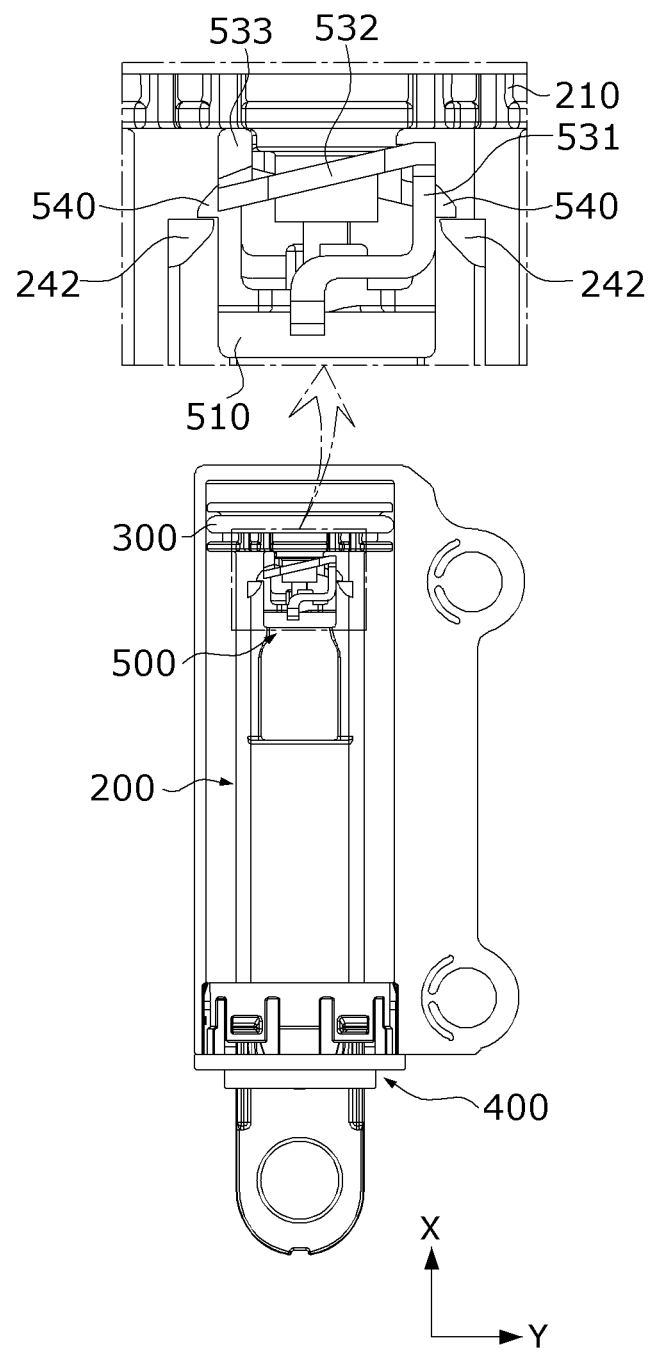
FIGS. 26 and 27 are views illustrating operation of the damper for a glove box according to the first embodiment when the glove box is heavy.
Figure 27:
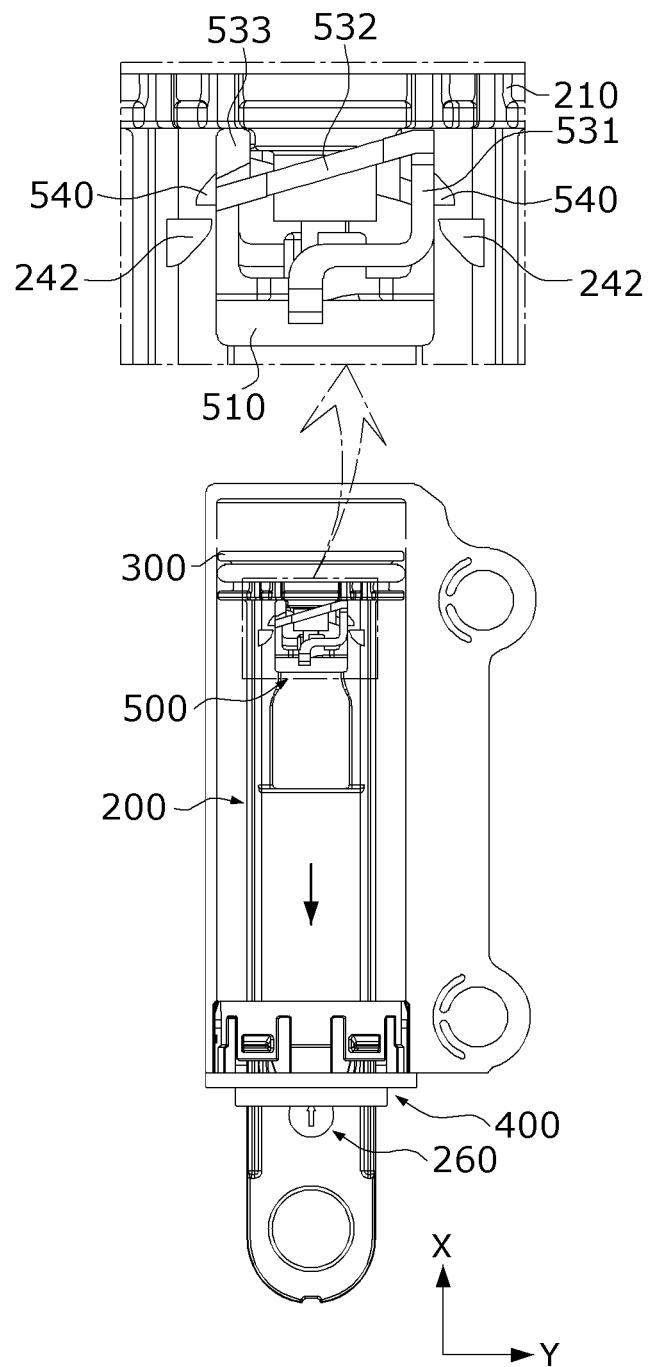

FIGS. 26 and 27 are views illustrating operation of the damper for a glove box according to the first embodiment when the glove box is heavy, wherein FIG. 26 is a view illustrating a position of the valve 500 when the glove box is closed, and FIG. 27 is a view illustrating a position of the valve 500 when the glove box is opened.

Referring to FIGS. 26 and 27, the valve 500 moves due to movement of the piston 200. Accordingly, while the leg 530 of the valve 500 comes in contact with and is pressed by the piston body 210, a shape of the leg 530 changes. In addition, the elastic force of the leg 530 generated according to the change in the shape is one factor in generation of a damping force of the damper 1.

In this case, the hook 540 may be disposed to correspond to the second stopper 242. In addition, since the second separation distance D2 of the second stopper 242 is smaller than the first separation distance D1 of the first stopper 241, the damper 1 may more effectively handle the case in which the glove box G is heavy to assist with smooth opening of the glove box G.

Due to movement of the valve 500, both the first region 531 and the third region 533 of the valve 500 may come into contact with the piston body 210. Accordingly, since a repulsive force increases due to two-point contact of the valve, even when the glove box G is heavy, the damper 1 can generate a greater damping force.

Second Embodiment

Figure 28:
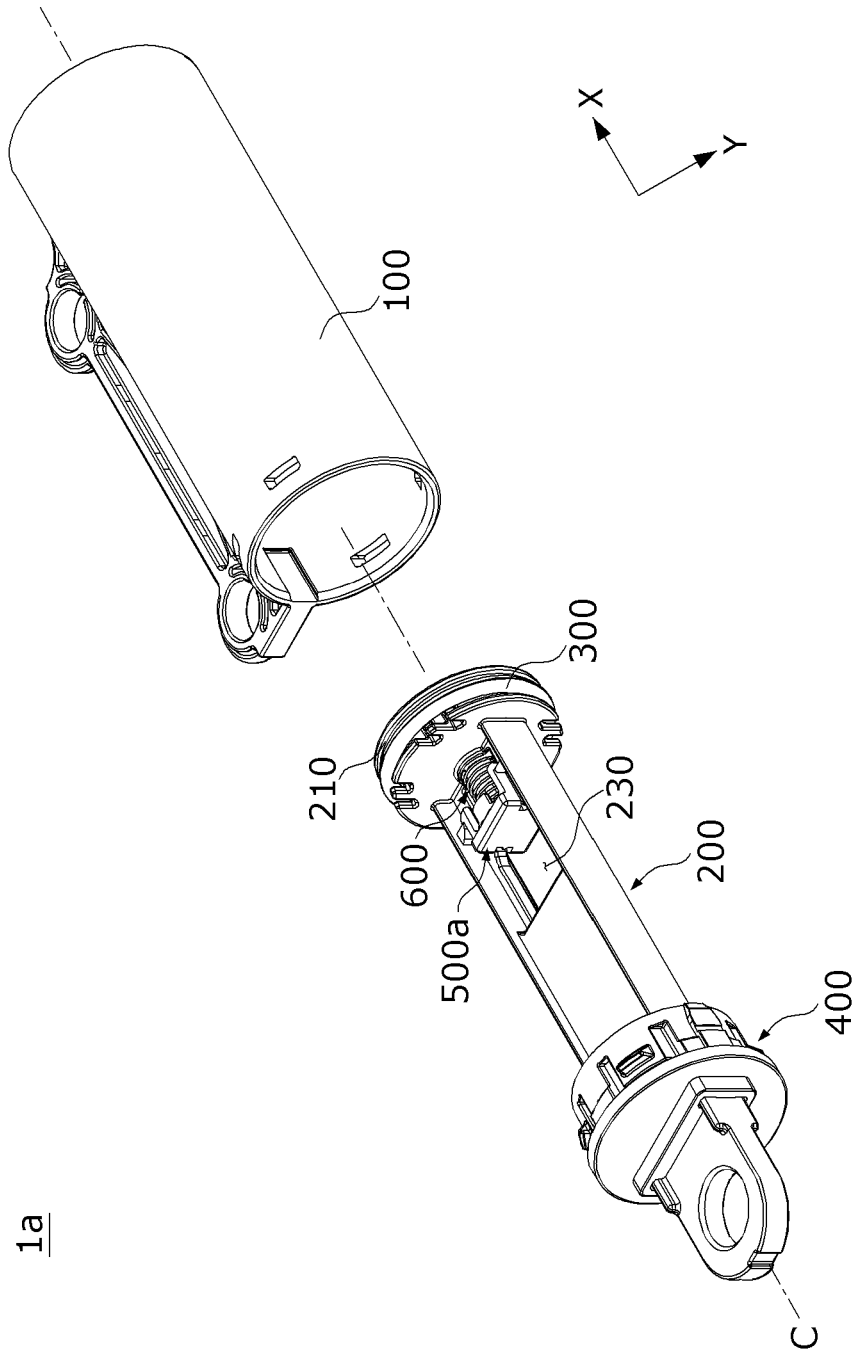
FIG. 28 is a perspective view illustrating a damper for a glove box according to a second embodiment.
Figure 29:
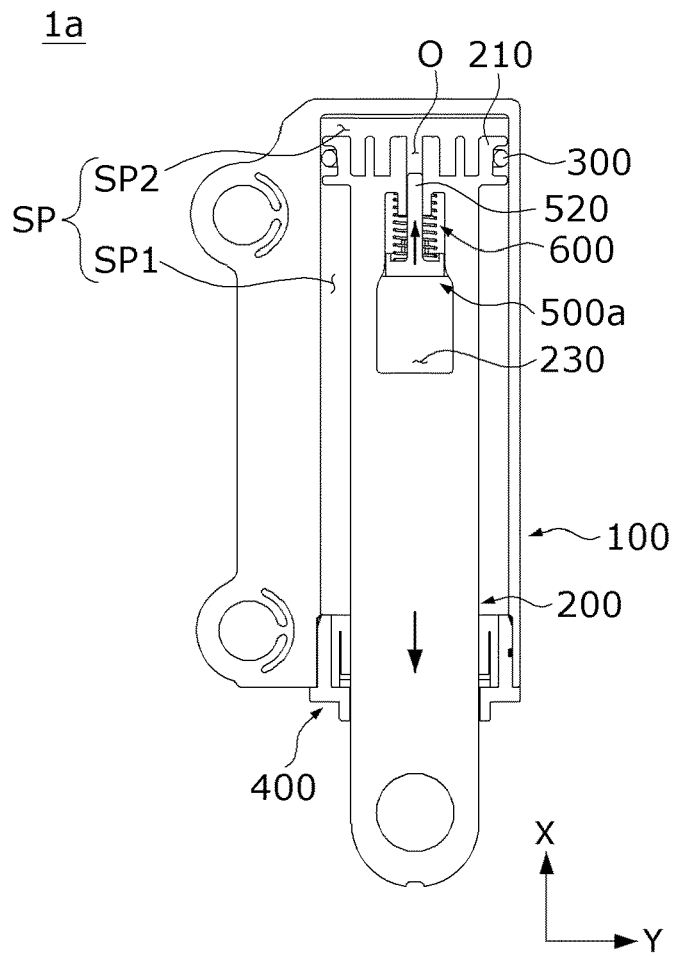
FIG. 29 is a cross-sectional view illustrating the damper for a glove box according to the second embodiment.
Figure 30:
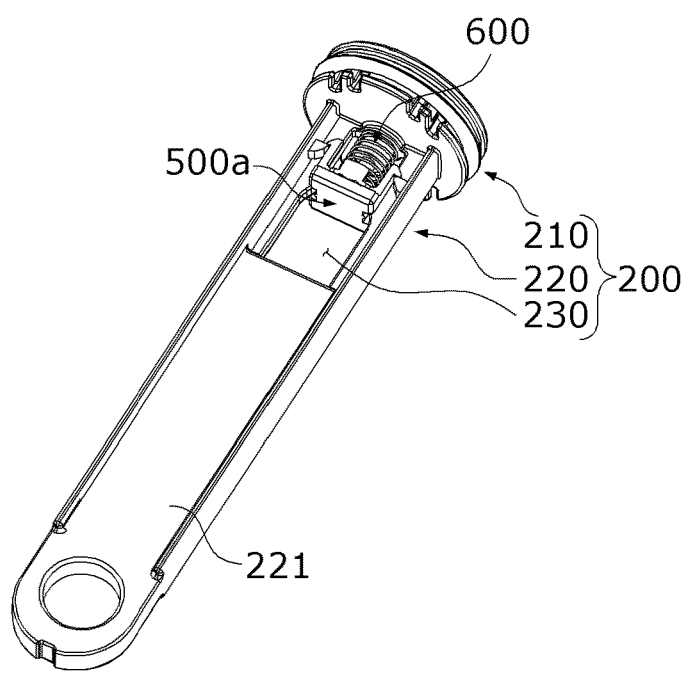
FIG. 30 is a perspective view illustrating a layout of a piston and a valve which are disposed in the damper for a glove box according to the second embodiment.
Figure 31:
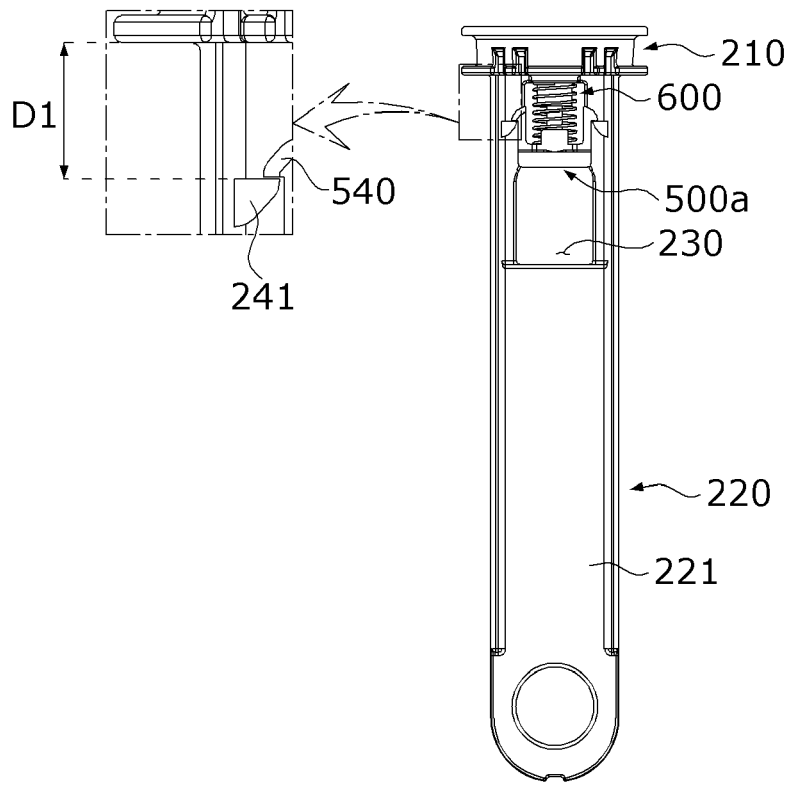
FIG. 31 is a front view illustrating the layout of the piston and the valve which are disposed in the damper for a glove box according to the second embodiment.
Figure 32:
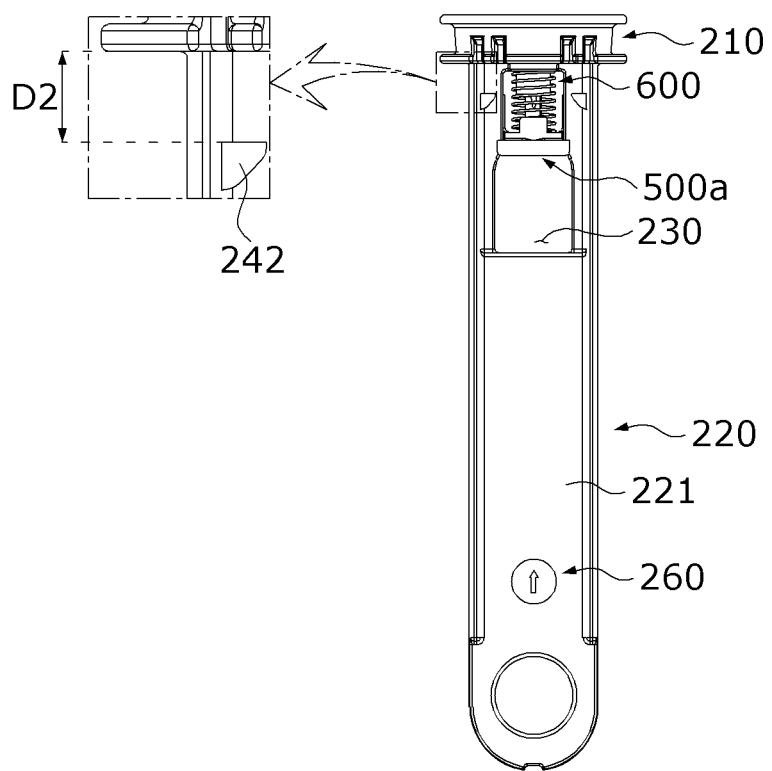
FIG. 32 is a rear view illustrating the layout of the piston and the valve which are disposed in the damper for a glove box according to the second embodiment.

FIG. 28 is a perspective view illustrating a damper for a glove box according to a second embodiment, FIG. 29 is a cross-sectional view illustrating the damper for a glove box according to the second embodiment, FIG. 30 is a perspective view illustrating a layout of a piston and a valve which are disposed in the damper for a glove box according to the second embodiment, FIG. 31 is a front view illustrating the layout of the piston and the valve which are disposed in the damper for a glove box according to the second embodiment, and FIG. 32 is a rear view illustrating the layout of the piston and the valve which are disposed in the damper for a glove box according to the second embodiment.

When the damper for a glove box according to the first embodiment and the damper for a glove box according to the second embodiment are compared with reference to FIGS. 28 to 32, there is a difference in that an elastic member 600 and a valve 500a corresponding to the elastic member 600 are used in the damper 1a for a glove box according to the second embodiment unlike the damper 1 for a glove box according to the first embodiment.

Accordingly, in the damper 1 for a glove box according to the first embodiment and the damper 1a for a glove box according to the second embodiment, the cylinder 100, the piston 200, the sealing member 300, and the cap 400 may be shared to reduce a production cost.

In description of the damper 1a for a glove box according to the second embodiment, the same reference symbols are assigned to components which are the same as those of the damper 1 for a glove box according to the first embodiment, and detailed description thereof will be omitted.

Referring to FIGS. 28 to 32, the damper 1a according to the second embodiment may include a cylinder 100 in which an opening is formed at one side thereof and which has a cylindrical shape, a piston 200 movably disposed in a space SP formed in the cylinder 100, a sealing member 300 disposed in an inner surface of the cylinder 100 and the piston 200, a cap 400 disposed to cover the opening of the cylinder 100, a valve 500a movably disposed in an accommodation portion 230 of the piston 200, and an elastic member 600 which elastically supports the valve 500a.

Accordingly, the damper 1a according to the second embodiment may be used only by replacing the components of the damper 1 for a glove box according to the first embodiment to correspond to the valve 500a and the elastic member 600.

The valve 500a may be movably disposed in the accommodation portion 230.

In addition, the valve 500a may adjust a damping force of the damper 1a while moving in a first direction due to movement of the piston 200. For example, the valve 500a may control an amount of air which flows through an orifice O through a position of the valve 500a in the first direction. In addition, the damper 1a may adjust the position of the valve 500a using the elastic member 600.

Figure 33:
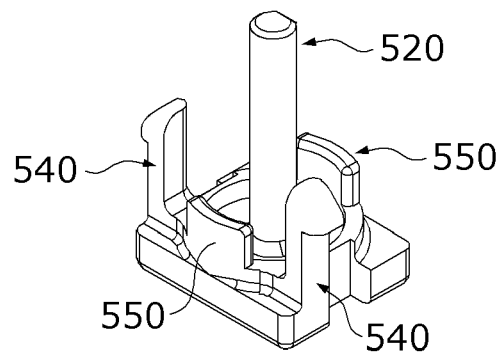
FIG. 33 is a perspective view illustrating the valve of the damper for a glove box according to the second embodiment.
Figure 34:
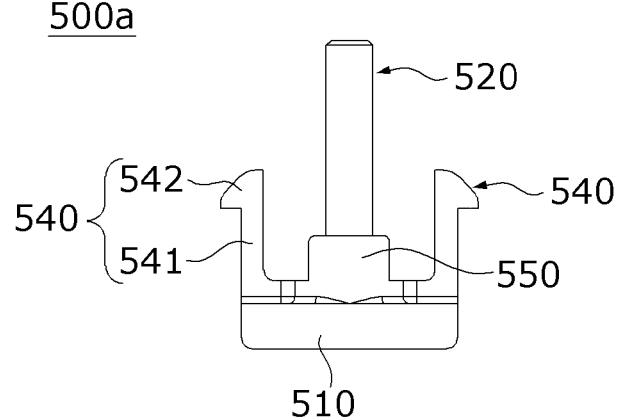
FIG. 34 is a front view illustrating the valve of the damper for a glove box according to the second embodiment.
Figure 35:
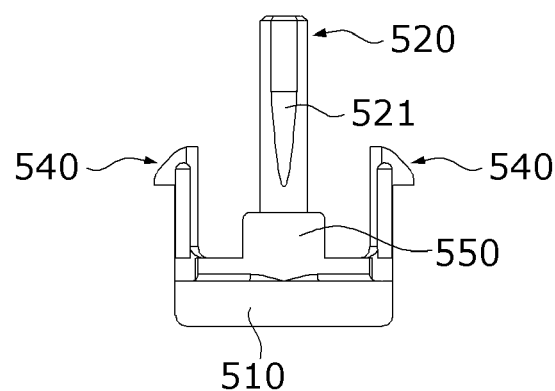
FIG. 35 is a rear view illustrating the valve of the damper for a glove box according to the second embodiment.
Figure 36:
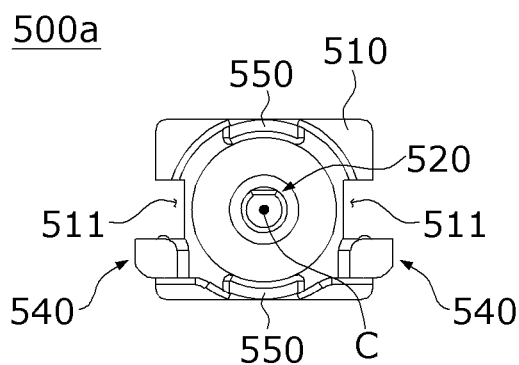
FIG. 36 is a plan view illustrating the valve of the damper for a glove box according to the second embodiment.
Figure 37:
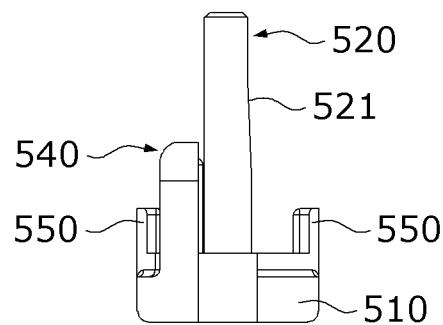
FIG. 37 is a side view illustrating the valve of the damper for a glove box according to the second embodiment.

FIG. 33 is a perspective view illustrating the valve of the damper for a glove box according to the second embodiment, FIG. 34 is a front view illustrating the valve of the damper for a glove box according to the second embodiment, FIG. 35 is a rear view illustrating the valve of the damper for a glove box according to the second embodiment, FIG. 36 is a plan view illustrating the valve of the damper for a glove box according to the second embodiment, and FIG. 37 is a side view illustrating the valve of the damper for a glove box according to the second embodiment.

Referring to FIGS. 33 to 37, the valve 500a may include a valve body 510 having a plate shape, a pin 520 formed to protrude from the valve body 510 in the first direction so that an end portion thereof is disposed in the orifice O, and hooks 540 disposed to correspond to stoppers 240.

In addition, the valve 500*a* may include escape prevention protrusions 550 to prevent the elastic member 600 from escaping. In this case, the valve body 510, the pin 520, the hooks 540, and the escape prevention protrusions 550 may be integrally formed.

The valve body 510 may be formed in a plate shape including an upper surface, a lower surface, and an outer side surface connecting the upper surface and the lower surface.

In addition, the valve body 510 may include grooves 511 concavely formed in the outer side surface thereof, and the grooves 511 may be coupled to guides formed in the accommodation portion 230. Accordingly, the valve 500*a* may be guided by the guides using the grooves 511.

The pin 520 may be formed to protrude from the upper surface of the valve body 510 in the first direction. In this case, the pin 520 may be formed to have a first length L1 in the first direction. In this case, a reference of the first length L1 may be the upper surface of the valve body 510. In addition, the first length L1 of the pin 520 may be referred to as a first protruding length or first height.

In addition, the pin 520 may be formed in a cylindrical shape and disposed in a central portion of the valve body 510.

In addition, the pin 520 may be movably disposed in the orifice O.

In addition, the pin 520 may be formed in a shape of which a cross-sectional area decreases toward the end portion. In addition, the pin 520 may include an inclined surface 521 having a predetermined inclination. Accordingly, the pin 520 may be implemented to have the shape of which the cross-sectional area decreases toward the end portion using the inclined surface 521.

Each of the hooks 540 may be formed to protrude from the upper surface of the valve body 510 in the first direction. In addition, according to movement of the valve 500*a*, an end portion of the hook 540 may come into contact with the piston body 210. Accordingly, since a repulsive force increases due to the contact of the hook 540, the damper 1*a* may also generate a greater damping force.

In addition, the hook 540 may include a hook body 541 formed to protrude in the first direction and a hook portion 542 formed to protrude from the hook body 541 in a second direction. In addition, the hook portion 542 may be disposed between the piston body 210 and a first stopper 241 or between the piston body 210 and a second stopper 242 to correspond to a load applied to a cover GC.

Each of the escape prevention protrusions 550 may be formed to protrude from the upper surface of the valve body 510 in the first direction.

In addition, the escape prevention protrusion 550 may be disposed apart from the pin 520 in a horizontal direction. Accordingly, the elastic member 600 may be disposed between the pin 520 and the escape prevention protrusion 550 in the horizontal direction. Accordingly, the escape prevention protrusion 550 may prevent the elastic member 600 from escaping.

The elastic member 600 may be disposed between the piston body 210 and the valve body 510 to elastically support the valve 500*a*. In this case, the elastic member 600 may be a member which is in contact with and compressed by the piston body 210 due to movement of the valve 500*a*. That is, the elastic member 600 may be the member pressed due to movement of the valve 500*a* to generate an elastic force. For example, the elastic member 600 may be provided as a coil spring.

One side of the spring may be in contact with a lower surface of the piston body 210, and the other side may be in contact with the upper surface of the valve body 510. In addition, as the valve 500*a* moves in the first direction, the spring may be compressed. In addition, the elastic force of the spring generated due to the compression is one factor in generation of a damping force of the damper 1*a*.

In this case, the spring may be disposed outside the protruding portion 250. In addition, a lower side of the spring may be disposed inside the escape prevention protrusions 550.

Figure 38:
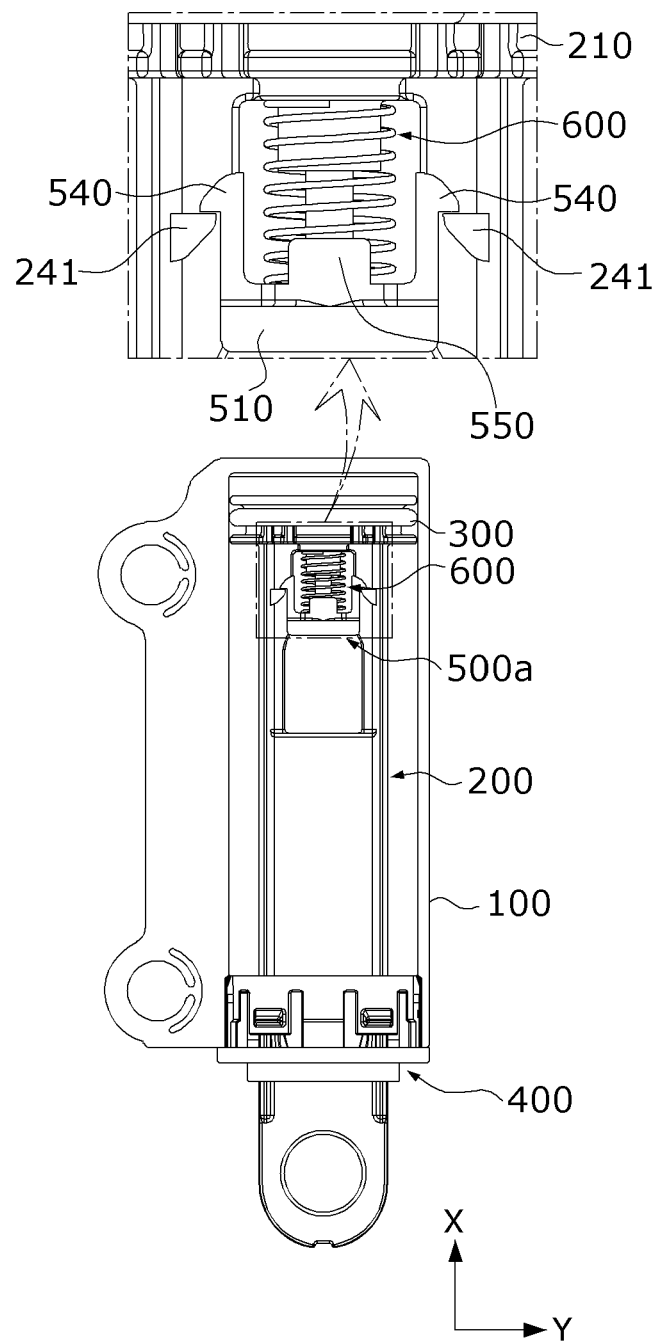
FIGS. 38 and 39 are views illustrating operation of the damper for a glove box according to the second embodiment when a glove box is light.
Figure 39:
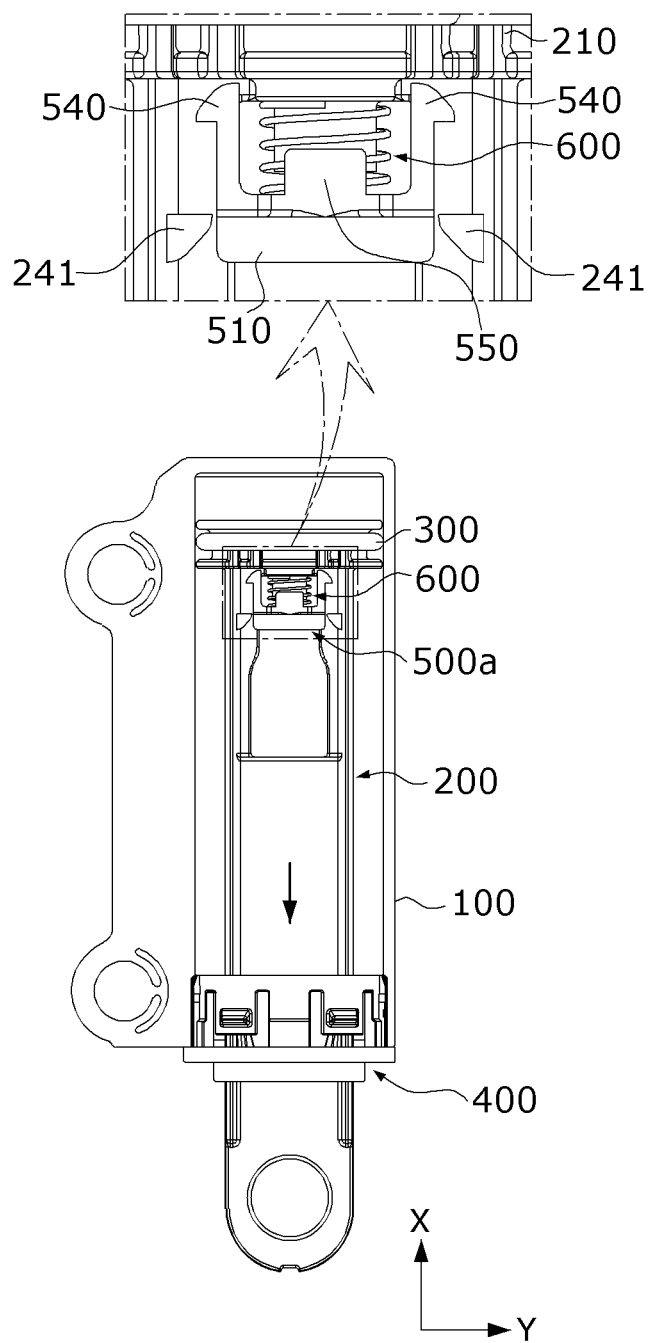

FIGS. 38 and 39 are views illustrating operation of the damper for a glove box according to the second embodiment when a glove box is light, wherein FIG. 38 is a view illustrating a position of the valve 500*a* when the glove box is closed, and FIG. 39 is a view illustrating a position of the valve 500*a* when the glove box is opened.

Referring to FIGS. 38 and 39, the valve 500*a* moves due to movement of the piston 200. Accordingly, while the elastic member 600 is in contact with and pressed by the piston body 210, a shape of the elastic member 600 changes. In addition, an elastic force of the elastic member 600 generated according to the change in the shape is one factor in generation of a damping force of the damper 1*a*.

In this case, the hook 540 may be disposed to correspond to the first stopper 241. Accordingly, the damper 1*a* may handle even a light load of the glove box G.

Figure 40:
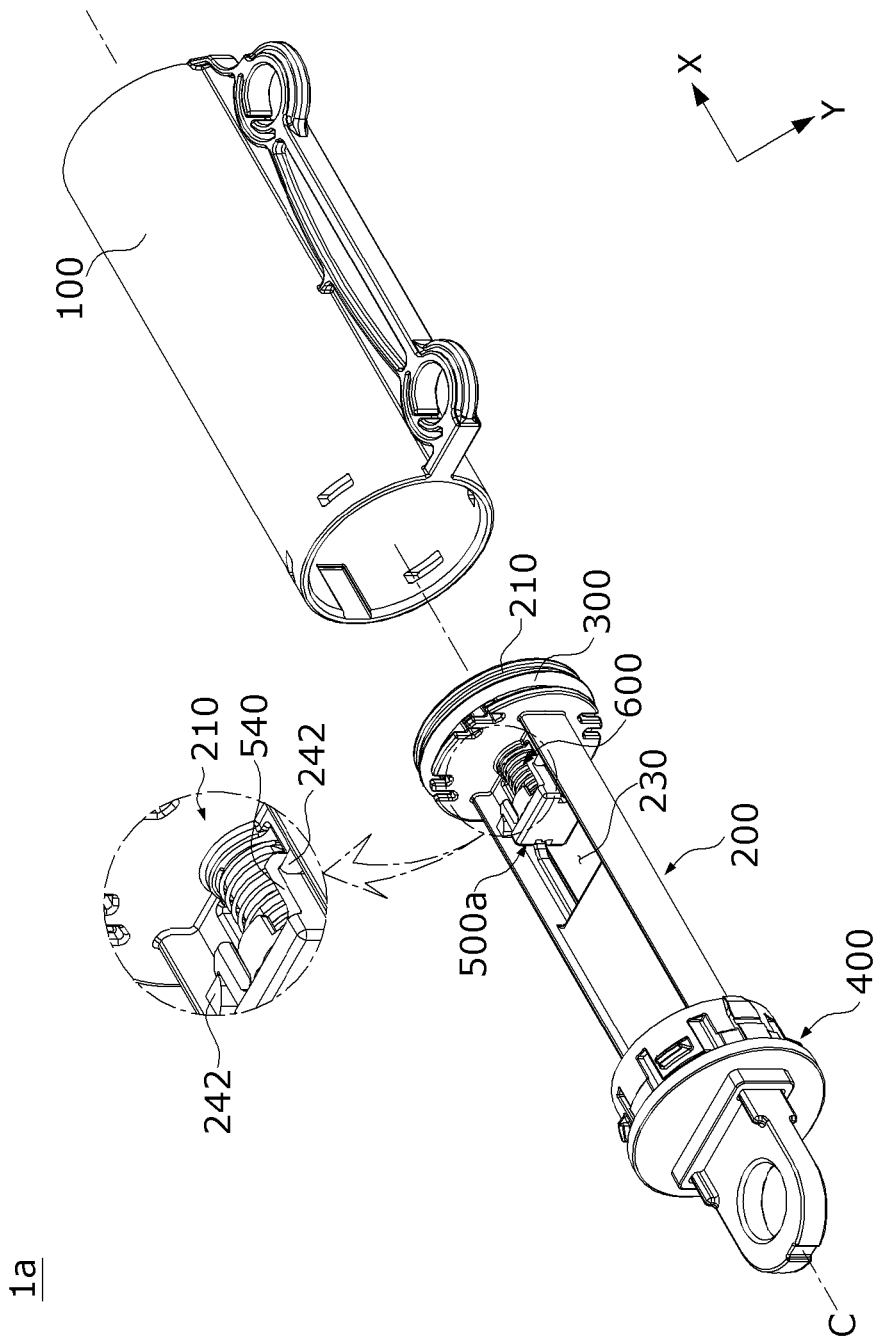
FIG. 40 is an exploded perspective view illustrating the damper for a glove box according to the second embodiment when a hook of the valve is disposed to correspond to a second stopper.
Figure 41:
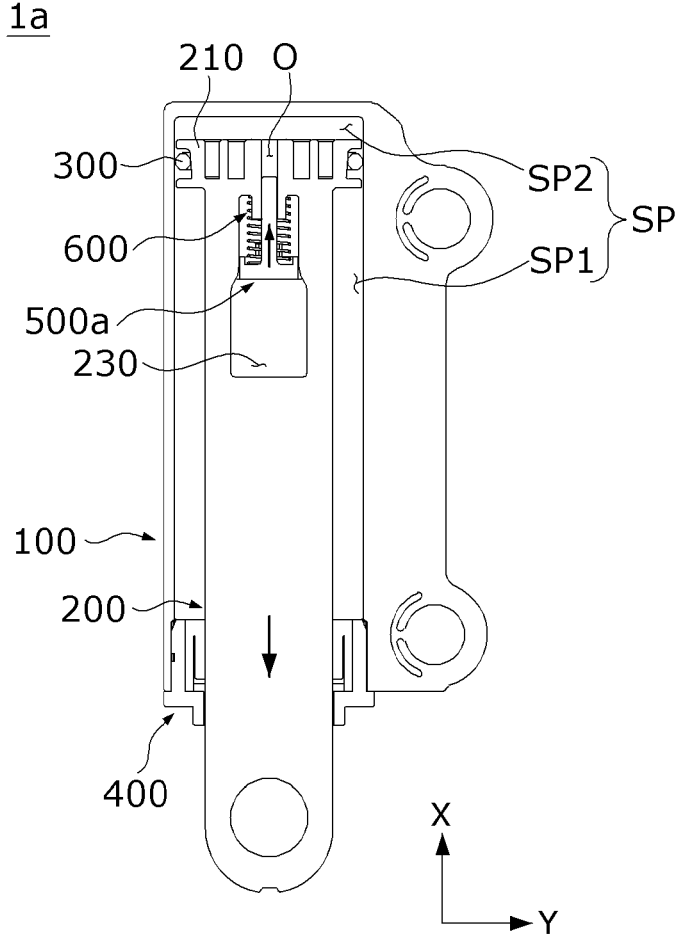
FIG. 41 is a cross-sectional view illustrating the damper for a glove box according to the second embodiment when the hook of the valve is disposed to correspond to the second stopper.

FIG. 40 is an exploded perspective view illustrating the damper for a glove box according to the second embodiment when the hook of the valve is disposed to correspond to the second stopper, and FIG. 41 is a cross-sectional view illustrating the damper for a glove box according to the second embodiment when the hook of the valve is disposed to correspond to the second stopper.

Referring to FIGS. 40 and 41, the hook 540 of the valve 500*a* may be disposed to correspond to the second stopper 242. Accordingly, the damper 1*a* may handle a case in which the glove box G is heavy.

Figure 42:
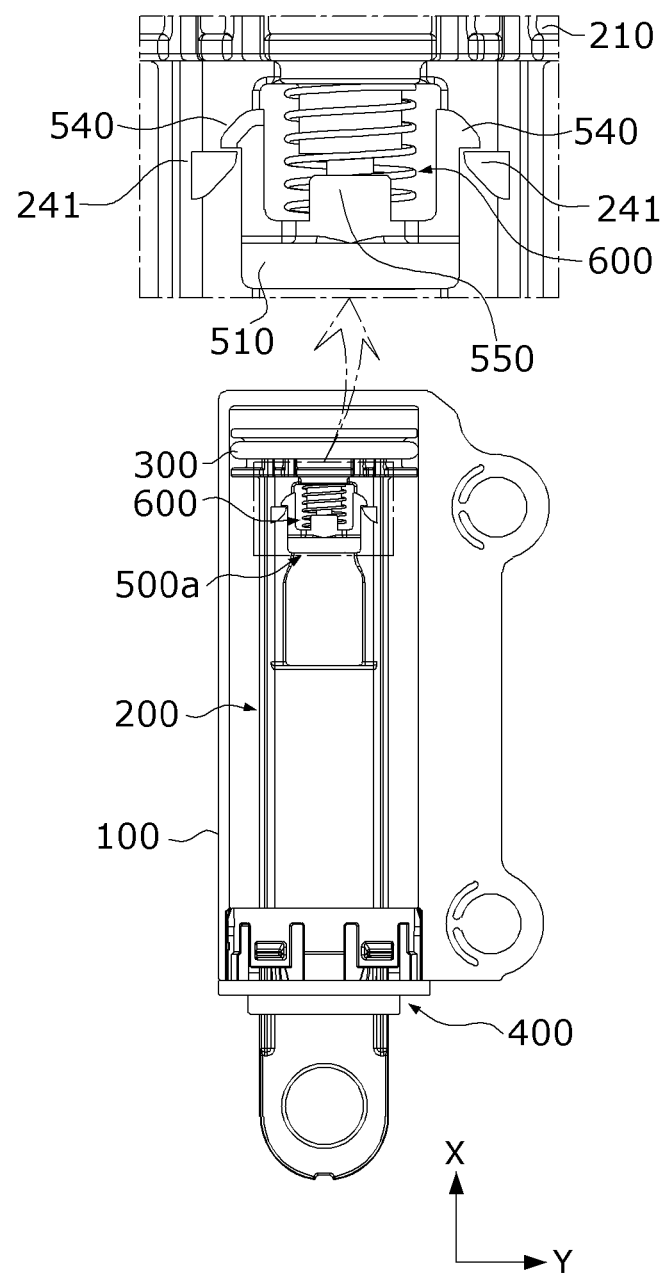

FIGS. 42 and 43 are views illustrating operation of the damper for a glove box according to the second embodiment when the glove box is heavy, wherein FIG. 42 is a view illustrating a position of the valve 500*a* when the glove box is closed, and FIG. 43 is a view illustrating a position of the valve 500*a* when the glove box is opened.

Referring to FIGS. 42 and 43, the valve 500*a* moves due to movement of the piston 200. Accordingly, while the elastic member 600 is in contact with and pressed by the piston body 210, the shape of the elastic member 600 changes. In addition, the elastic force of the elastic member 600 generated according to the change in the shape is one factor in generation of a damping force of the damper 1*a*.

In this case, the hook 540 may be disposed to correspond to the second stopper 242. In addition, since a second separation distance D2 of the second stopper 242 is smaller than a first separation distance D1 of the first stopper 241, the damper 1*a* may more effectively handle a case in which the glove box G is heavy to assist with smooth opening of the glove box G.

According to embodiments, movement of a cover can be controlled at a constant speed regardless of a load applied to the cover of a glove box using a damper for a glove box. Accordingly, the cover can smoothly and stably open the glove box.

Various useful advantages and effects of the embodiments are not limited to the above-described contents and will be more easily understood from descriptions of the specific embodiments.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A damper for a glove box, comprising:
a cylinder;
a piston movably disposed in the cylinder; and
a valve movably disposed in an accommodation portion of the piston,
wherein the piston comprises a piston body in which an orifice is formed and a rod formed to protrude from the piston body and in which the accommodation portion is disposed,
the valve comprises a valve body, a pin formed to protrude from the valve body to have an end portion thereof disposed in the orifice, and a leg formed to protrude from the valve body, and
the valve is configured to move due to movement of the piston in a direction opposite to a movement direction of the piston to have the leg come into contact with the piston body.

2. The damper of claim 1, wherein:
the piston further comprises a stopper disposed on the rod;
the valve further comprises a hook disposed to correspond to the stopper; and
the hook is formed to protrude from the valve body.

3. A glove box comprising:
a glove box body and a cover forming an accommodation space therebetween; and
the damper of claim 1,
wherein the glove box body is rotationally disposed in a dashboard of a vehicle, and
the damper adjusts a movement speed of the glove box body.

4. The damper of claim 2, wherein:
the stopper comprises a first stopper disposed on a first surface of the rod and a second stopper disposed on a second surface of the rod;
a first separation distance from the piston body to the first stopper is greater than a second separation distance from the piston body to the second stopper; and
a hook portion of the hook is disposed between the piston body and the first stopper or between the piston body and the second stopper.

5. The damper of claim 2, wherein the piston further comprises a protruding portion formed to protrude from the piston body to allow the orifice to extend.

6. The damper of claim 2, further comprising a sealing member disposed on an outer side surface of the piston body.

7. The damper of claim 2, wherein:
the rod comprises a first surface and a second surface opposite to the first surface; and
a recognition part is disposed on the first surface or the second surface.

8. A damper for a glove box, comprising;
a cylinder;
a piston movably disposed in the cylinder; and
a valve movably disposed in an accommodation portion of the piston,
wherein the piston comprises a piston body in which an orifice is formed, a rod formed to protrude from the piston body and in which the accommodation portion is disposed, and a plurality of stoppers disposed on the rod,
the valve comprises a valve body, a pin formed to protrude from the valve body to have an end portion thereof disposed in the orifice, and a leg and a hook formed to protrude from the valve body, and
the hook is disposed to correspond to each of the stoppers.

9. The damper of claim 8, wherein:
the stoppers comprise a first stopper disposed on a first surface of the rod and a second stopper disposed on a second surface of the rod;
a first separation distance from the piston body to the first stopper is greater than a second separation distance from the piston body to the second stopper; and
a hook portion of the hook is disposed between the piston body and the first stopper or between the piston body and the second stopper.

10. The damper of claim 8, further comprising a sealing member disposed on an outer side surface of the piston body.

11. The damper of claim 8, wherein:
the rod comprises a first surface and a second surface opposite to the first surface; and
a recognition part is disposed on the first surface or the second surface.

12. A glove box comprising:
a glove box body and a cover forming an accommodation space therebetween; and
the damper of claim 8,
wherein the glove box body is rotationally disposed in a dashboard of a vehicle, and
the damper adjusts a movement speed of the glove box body.

13. The damper of claim 9, wherein an outer side surface of the pin comprises an inclined surface having a predetermined inclination.

14. The damper of claim 9, wherein a contour of the pin has a cross-sectional area that decreases towards an end portion thereof.

15. The damper of claim 13, wherein a first length of the pin is greater than a second length of the leg based on the valve body.

16. The damper of claim 9, wherein the leg comprises:
a first region formed to protrude from the valve body in a first direction;
a second region extending from an end portion of the first region in a second direction; and
a third region extending from an end portion of the second region in the first direction.

17. The damper of claim 16, wherein a distance from the valve body to the end portion of the first region in the first direction is smaller than another distance from the valve body to an end portion of the third region in the first direction.

18. The damper of claim 16, wherein the end portion of the first region and an end portion of the third region are configured to come into contact with the piston body due to movement of the valve.

19. The damper of claim 9, wherein the leg is provided as at least two legs disposed to be rotationally symmetrical with respect to a center of the valve body.

20. The damper of claim 8, wherein the piston further comprises a protruding portion formed to protrude from the piston body to allow the orifice to extend.

21. A damper for a glove box, comprising:
a cylinder;
a piston movably disposed in the cylinder;
a valve movably disposed in an accommodation portion of the piston; and
an elastic member elastically supporting the valve,
wherein the piston comprises a piston body in which an orifice is formed, a rod formed to protrude from the piston body and in which the accommodation portion is formed, and a plurality of stoppers disposed on the rod,
the valve comprises a valve body, a pin formed to protrude from the valve body to have an end portion thereof disposed in the orifice, and a hook formed to protrude from the valve body,
the elastic member is disposed between the piston body and the valve body, and
the hook is disposed to correspond to each of the stoppers.

22. The damper of claim 21, wherein:
the stoppers comprise a first stopper disposed on a first surface of the rod and a second stopper disposed on a second surface of the rod;
a first separation distance from the piston body to the first stopper is greater than a second separation distance from the piston body to the second stopper; and
a protruding portion of the hook is disposed between the piston body and the first stopper or between the piston body and the second stopper.

23. The damper of claim 22, wherein an outer side surface of the pin comprises an inclined surface having a predetermined inclination.

24. The damper of claim 22, wherein a contour of the pin has a cross-sectional area that decreases towards an end portion thereof.

25. The damper of claim 21, wherein the piston comprises a protruding portion formed to protrude from the piston body to allow the orifice to extend.

26. The damper of claim 25, wherein:
the elastic member is provided as a coil spring having one side in contact with the piston body and another side in contact with the valve body; and
the spring is disposed outside the protruding portion.

27. The damper of claim 26, wherein:
the valve comprises an escape prevention protrusion formed to protrude from the valve body; and
the spring is disposed inside the escape prevention protrusion.

28. The damper of claim 21, further comprising a sealing member disposed on an outer side surface of the piston body.

29. The damper of claim 28, wherein:
the cylinder comprises an inclined surface disposed thereinside; and
the inclined surface has a predetermined inclination in the first direction.

30. The damper of claim 21, wherein:
the rod comprises a first surface and a second surface opposite to the first surface; and
a recognition part is disposed on the first surface or the second surface.

31. A glove box comprising:
a glove box body and a cover forming an accommodation space therebetween; and
the damper of claim 21,
wherein the glove box body is rotationally disposed in a dashboard of a vehicle, and
the damper adjusts a movement speed of the glove box body.

* * * * *